US007717783B2

(12) United States Patent
Pfeiffer et al.

(10) Patent No.: US 7,717,783 B2
(45) Date of Patent: May 18, 2010

(54) COMPUTER-BASED, INTERACTIVE, REAL-TIME CARD SELECTION GAME

(75) Inventors: Arthur M. Pfeiffer, Palo Alto, CA (US); Daniel Pfeiffer, San Francisco, CA (US)

(73) Assignee: ThwartPoker Inc., Palo Alto, CA (US)

( * ) Notice: Subject to any disclaimer, the term of this patent is extended or adjusted under 35 U.S.C. 154(b) by 1240 days.

(21) Appl. No.: 10/867,614

(22) Filed: Jun. 14, 2004

(65) Prior Publication Data

US 2004/0259621 A1 Dec. 23, 2004

Related U.S. Application Data

(60) Provisional application No. 60/479,774, filed on Jun. 18, 2003.

(51) Int. Cl.
*A63F 13/00* (2006.01)

(52) U.S. Cl. .......................................... 463/11; 463/13

(58) Field of Classification Search .................. 463/42, 463/20
See application file for complete search history.

(56) References Cited

U.S. PATENT DOCUMENTS 4,662,637 A 5/1987 Pfeiffer
4,667,959 A 5/1987 Pfeiffer et al.
4,760,527 A 7/1988 Sidley
4,926,327 A 5/1990 Sidley
5,374,067 A 12/1994 Jones
5,377,973 A 1/1995 Jones et al.
5,558,339 A 9/1996 Perlman
5,586,766 A 12/1996 Forte et al.
5,762,552 A 6/1998 Vuong et al.
5,868,619 A 2/1999 Wood et al.
5,928,081 A * 7/1999 Bochichio et al. ............. 463/13
5,947,821 A 9/1999 Stone
5,951,012 A 9/1999 Feola
5,971,849 A 10/1999 Falciglia
6,012,720 A 1/2000 Webb
6,117,011 A 9/2000 Lvov
6,132,311 A * 10/2000 Williams ..................... 463/13
6,273,820 B1 8/2001 Haste, III (Continued)

OTHER PUBLICATIONS

Thwart Poker: Help Section. Dated: Sep. 28, 2002 <URL:http://web.archive.org/web/20021212010134/www.thwartpoker.com/help.html>.*

(Continued)

*Primary Examiner*—John M Hotaling, II
(74) *Attorney, Agent, or Firm*—Patent Law Group LLP; Brian D. Ogonowsky

(57) ABSTRACT

The invention is a method of playing computerized card games against real or virtual players. The cards games are usually variations of poker, where the quality of the players' hands is due to skill and strategy rather than the luck of the draw. Players request desired cards from a computerized dealer without knowledge of which cards other players have requested. A null card, which has no value in determining the outcome of the game, is delivered to players who request the same card as another player has requested regardless of whether the card was requested previously or during the current round. In another embodiment, a null card is delivered only when two or more players request the same card during the current round or if a player requests a card that has already been distributed.

24 Claims, 27 Drawing Sheets

U.S. PATENT DOCUMENTS 6,375,189 B1 4/2002 Jones
6,386,973 B1 5/2002 Yoseloff
6,390,474 B1 5/2002 Terminel et al.
6,454,266 B1 9/2002 Breeding et al.
6,508,709 B1 1/2003 Karmarkar
6,533,658 B1 * 3/2003 Walker et al. ................. 463/13
6,679,777 B2 * 1/2004 Pfeiffer et al. ................ 463/42
2001/0035608 A1 11/2001 Hoyt et al.
2003/0032481 A1 2/2003 Pfeiffer et al.

OTHER PUBLICATIONS

PCT International Search Report and Written Opinion, 10 pages.

* cited by examiner

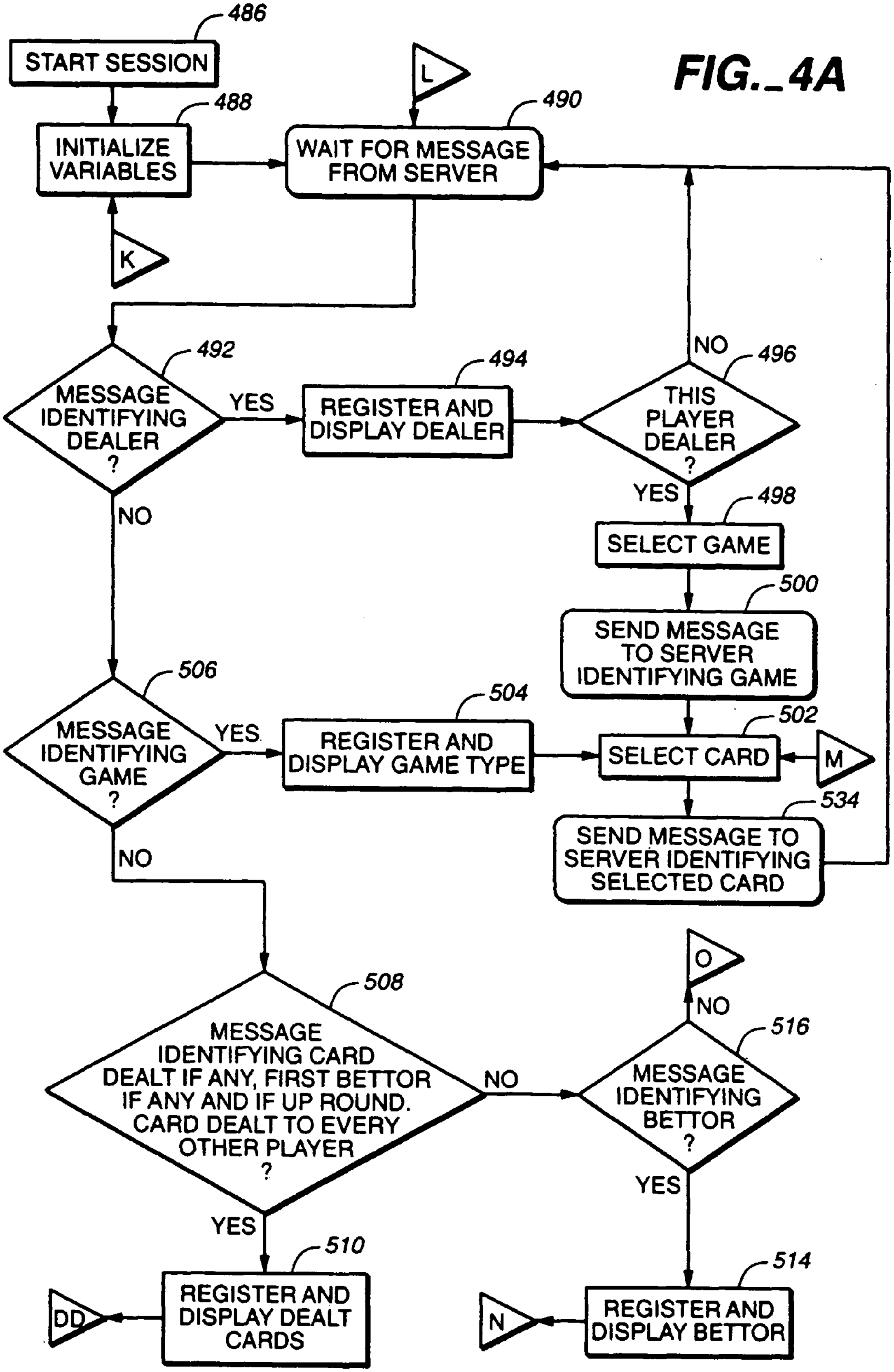

486
START SESSION
488
INITIALIZE VARIABLES
K
L
490
WAIT FOR MESSAGE FROM SERVER
FIG._4A
492
MESSAGE IDENTIFYING DEALER ?
YES
494
REGISTER AND DISPLAY DEALER
NO
496
THIS PLAYER DEALER ?
YES
498
SELECT GAME
NO
500
SEND MESSAGE TO SERVER IDENTIFYING GAME
506
MESSAGE IDENTIFYING GAME ?
YES
504
REGISTER AND DISPLAY GAME TYPE
502
SELECT CARD
M
534
SEND MESSAGE TO SERVER IDENTIFYING SELECTED CARD
NO
O
NO
508
MESSAGE IDENTIFYING CARD DEALT IF ANY, FIRST BETTOR IF ANY AND IF UP ROUND. CARD DEALT TO EVERY OTHER PLAYER ?
NO
516
MESSAGE IDENTIFYING BETTOR ?
YES
YES
510
REGISTER AND DISPLAY DEALT CARDS
DD
514
REGISTER AND DISPLAY BETTOR
N

COMPUTER-BASED, INTERACTIVE, REAL-TIME CARD SELECTION GAME

CROSS-REFERENCE TO RELATED APPLICATIONS

This application is based on provisional application Ser. No. 60/479,774, filed on Jun. 18, 2003, entitled COMPUTER-BASED, INTERACTIVE, REAL-TIME CARD SELECTION GAME.

TECHNICAL FIELD

The present invention relates to computer-based multiplayer card games in which players select cards that follow the rules of poker.

BACKGROUND

The game of poker is well known and the rules can be found in nearly every card game rule book. In the game of poker cards are dealt to each player. Players may have a chance to improve their hand by discarding some of their cards, and receiving replacements, as in draw poker, or more cards may be dealt than needed and the best cards retained, as in the seven-card variations of poker. Various rounds of betting take place after dealing and after drawing. In five-card stud poker, one card is dealt face down and the four remaining cards are dealt face up one at a time with a round of betting after each face up card is dealt. In all variations of poker, when the betting rounds are completed, the remaining players expose their hands and the winning player collects the money bet. The outcome is determined by the combinations of cards in the exposed hands. Those combinations are well known—high card, one pair, two pair, three-of-a-kind, straight, flush, full house, four-of-a-kind, and straight flush—and are described in nearly every card game rule book.

Unfortunately, in poker good combinations such as a straight flush, four-of-a-kind and full house are rare. Most people are reluctant to bet much when they hold only one or two pair. As a result, too many people drop out of the betting early, which may frustrate even people with good hands. One common solution is to introduce wild cards to increase the chances of receiving a good hand and thus keep the game interesting, but getting a wild card involves more luck than skill.

U.S. Pat. No. 4,662,637 to A. Pfeiffer discloses a method of playing a card game in which the players select desired cards which are delivered to players unless a player requests the same card that another player has requested during the same round of play or was dealt on a previous round, in which case a null card, having no value in determining the outcome of the game, is delivered to the requesting player. Poker rules are used to determine the outcome of the game.

U.S. Pat. No. 4,667,959 to A. Pfeiffer discloses a selector unit and card-storage carousel for playing a card game disclosed in U.S. Pat. No. 4,662,637.

Many games are now played on computers and the concept of playing card games over a network such as the Internet is well-known. Patents have been granted to new card games that include claims which cover playing the game over the Internet. For instance, U.S. Pat. No. 5,951,012 discloses a poker game where the amount of successive wagers is pre-established by the players; this game may be played on the Internet. Similarly, U.S. Pat. No. 6,012,720 discloses "enhanced features" of the card game Double Hand; this game may also be played on the Internet.

None of the prior art, however, discloses how to play a computerized card game with multiple variations where a player vies with other players, real and/or virtual, to choose cards that will result in the best possible hand.

SUMMARY

The invention is a method of playing computerized multi-player card games, usually variations of poker, where the quality of players' hands is due to skill and strategy rather than "the luck of the draw." Players request desired cards from a separate dealer without knowledge of which cards other players have requested. A null card, which has no value in determining the outcome of the game, is delivered to players who request the same card as another player has requested regardless of whether the card was requested previously or during the current round. In another embodiment, a null card is delivered only when two or more players request the same card during the current round or if a player requests a card that has already been distributed.

In one embodiment, each player has a copy of the software for the game on his/her computer, which is connected to a network. The software is configured as client-side software. Players connect to a server which runs the same software (although configured as server-side software) as the players and play the game over the Internet. The server assigns players to playing sessions, populates those sessions with virtual players if there aren't enough real players to fill that session, controls the virtual players, determines which player should receive which cards, keeps score, tracks the order of play, etc.

This invention offers substantial improvements over the game initially disclosed by the inventor in U.S. Pat. No. 4,662,637. The patented method only describes one method of playing the game. Also, players need to use the selector unit and carousel for storing cards disclosed in U.S. Pat. No. 4,667,959 in order to play the game.

This invention discloses a new card game, in which a player receives a null card if he or she requests a card that has been requested in previous rounds or by another player in the current round. This innovation makes the game far more challenging than previous versions in terms of selection and betting strategies. This invention also allows players to play the previously patented version and allows players to choose which game (five card stud, draw poker, etc.) they wish to play.

This invention improves the player's game-playing experience. When the game is played on a computer, the software can track the selection of cards, the order of selection, the delivery order of cards, the delivery of cards, the betting order, the amount each player bets, and the overall score, or total, for each player. In the non-computerized version, the players have to track these details on their own which may lead to confusion and delays in the game. When the game is played on a computer, the software also displays to each player which card was selected during each previous round, whereas in the non-computerized version, each player had to memorize both the value and round of each card they selected on a previous round that resulted in a null card being dealt to them. The invention also allows the game to be played at a faster pace, allowing players to spend more time actually playing the game than waiting for routine chores to be completed. For instance, once all the players have communicated to the dealer what card they want, delivery of the cards to the players is instantaneous (distribution of cards could take as long as 15 seconds using the prior art's selection unit and carousel). Also, the software can calculate and post scores much faster than individuals playing the non-computerized version. Once a game is completed, the next game can begin immediately. The prior art's selector unit and carousel requires cards to be reloaded after every game; this can take as long as thirty seconds. The prior art selector unit and carousel also required specially labeled cards in order to operate; the present invention does not require similar accessories.

Finally, because this game is played on the Internet, players are now able to play the game whenever they wish instead of being limited to playing at times only when they are in a room with a suitable number of other players. Players may also play with other real players, virtual players controlled by the software, or a combination of the two. Players may also choose to play against a chosen group of players or against randomly selected players.

BRIEF DESCRIPTION OF THE DRAWINGS

FIG. 4*a* is a flow chart showing client software operations in accordance with the invention.

DETAILED DESCRIPTION

A computer-based multiplayer card selection game as disclosed herein can best be played over the Internet in order to accommodate the broadest range of players, no matter where they are located. While the Internet is the preferred operating environment, it is not the only networked environment for playing such a game; for instance, hand-held computers (i.e., Personal Digital Assistants) can communicate via an infrared signal, allowing the operators to play each other, or video game hardware as used in game arcades can be linked together by a local area network.

Figure 1:
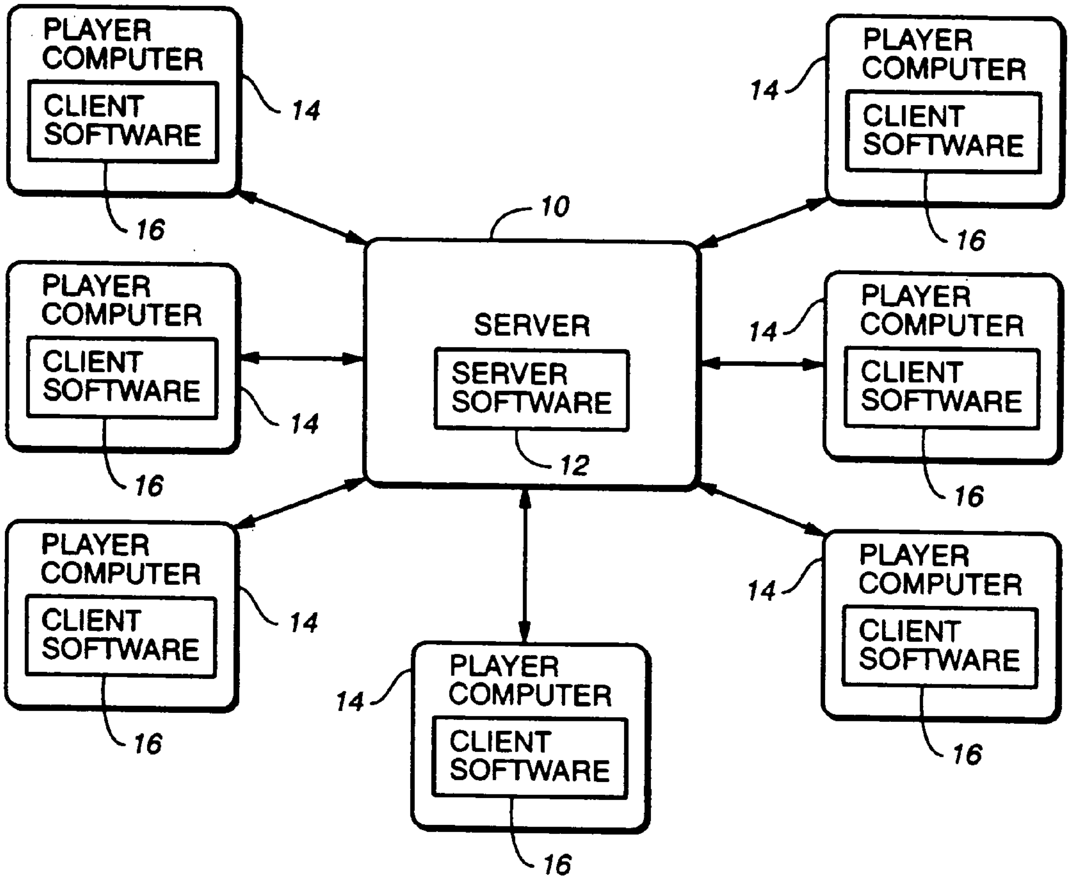
FIG. 1 is a block diagram showing the configuration of players=computers and the server in accordance with the invention.

With respect to FIG. 1, two software modules, configured either as client-side or server-side software, are involved in managing and facilitating game play. Each player's computer 14 contains a copy of the client software module 16 (which can be downloaded from a World Wide Web page featuring the same) which provides him or her with the capability to select and view cards (either as images or descriptive text) and bets, to communicate such selections to the server software (which will in turn communicate some of this information to the other players). The client software receives and displays information from the server software regarding which player is the dealer only for game selection, when to select a card or bet, what the betting position is, what cards are dealt to that player, what card is dealt to each of the other players in a round where cards are dealt face-up, what actions other players have taken, and, when a game is over, who the winners are and how much each has won and the value of each face down card the remaining players were dealt.

The server software module 12, which usually resides on a computer (server) 10 separate from the other players' computers 14 in order to protect privacy, provides overall management of the game flow by receiving card and bet selection information from each player as well as game selection information from the dealer. The server software 12 also sends information to each player regarding when a new game begins, which player is the dealer for only selecting the next game, what game the dealer selected, when a new round begins, what card is dealt to that player, what card is dealt to each of the other players for a round where cards are dealt face-up, which player is the current bettor, what bet the current bettor made, and, when the game is over the value of each face-down card the remaining players were dealt, which players won and each player's holdings. The server software 12 also determines whether the desired card or a null card (which may be represented by a joker) is dealt to a player and for each virtual player determines either its selected card or selected bet when that virtual player's turn comes.

Figure 2:
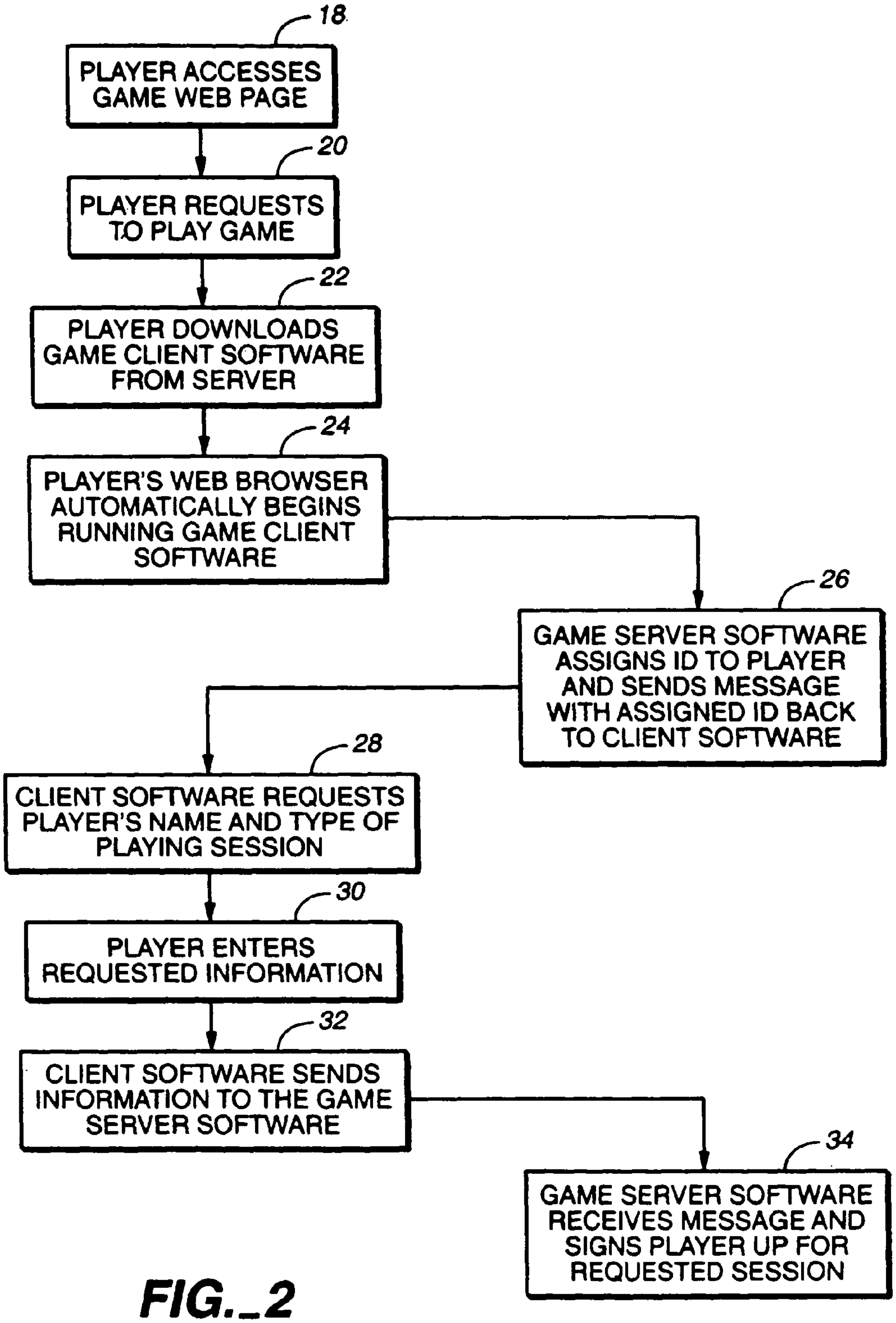
FIG. 2 is a flow chart showing how a player obtains software and registers to play the game in accordance with the invention.

In FIG. 2, a prospective player accesses the World Wide Web page featuring the game (step 18) and requests to play (step 20). The game client software module is downloaded from the game server to the player's computer (step 22). The player's Web browser then automatically begins running the game client software (step 24). The game server software assigns an ID to this potential player and sends a message with the assigned ID back to the player's client software (step 26). When the client software receives the assigned ID message from the server, it then queries the player about his or her name and what type of playing session, "Original" (where a player receives a desired card only if it has not been requested by another player during that round or previously distributed) or "One Shot" (where a player receives a desired card only if has not been requested in the current round by another player or any previous round) they want to join (step 28). The player enters the requested information (step 30); once these questions are answered, the game client software automatically sends a message back to the game server software containing the player's name, type of playing session, and the player's IP address which identifies the player's unique computer on the Internet (step 32). The game server software signs the player up for the requested session after receiving the message from the client software (step 34).

The game client software does not need to be downloaded every time a player wishes to play the game; a saved copy of the game client software may be used instead. However, a connection between the client and server software must be established and information exchanged as discussed above in order for the server software to sign up the player for a session. The client software may save a profile of the player and transmit this profile to the server in order to speed up the registration process.

In the preferred embodiment, a session starts after either seven players have signed up or fifteen minutes have elapsed, whichever occurs first. Where fewer than seven players have signed up by the time a session is scheduled to start, vacancies are filled by virtual players. Other embodiments may have fewer than seven players per playing session and may have a different sign-up period.

Figure 3A:
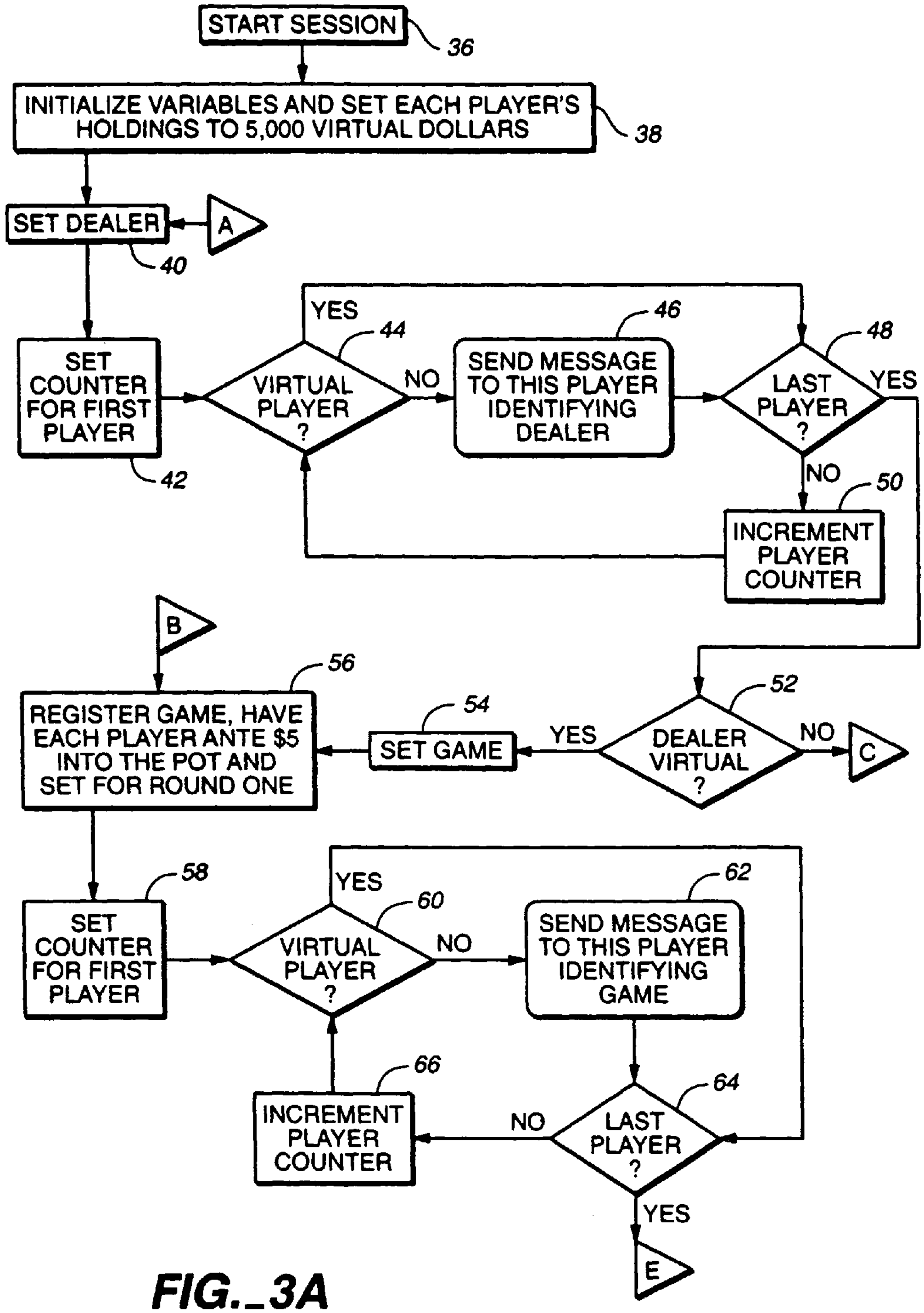
FIG. 3*a* is a flow chart showing how the server software begins a session of play in accordance with the invention.

With regard to FIG. 3*a*, at the start of a playing session (step 36), the server software initializes key variables, such as the player's holding (in this embodiment, five thousand "virtual dollars"), the number of players, etc. (step 38). The server software randomly selects which player is the first dealer (step 40). (The player who is the dealer only chooses the game to be played. Cards are actually distributed by the server software based on whether a playing session is "Original" or "One Shot.") For subsequent games the server software cycles through the players to select the dealer. A counter is set for the first player (step 42). The server software then determines whether this player is a virtual player (step 44). If not, a message is sent to the real player identifying the dealer (step 46). The server software then checks to see if the player is the last player (step 48). If not, the player counter is incremented (step 50) and the server software determines whether the next player is a virtual player (step 44). When the server software determines that there is a virtual player, no message is sent to the player identifying the dealer; instead, the server software determines whether there are any more players to be notified (step 48).

Figure 3B:
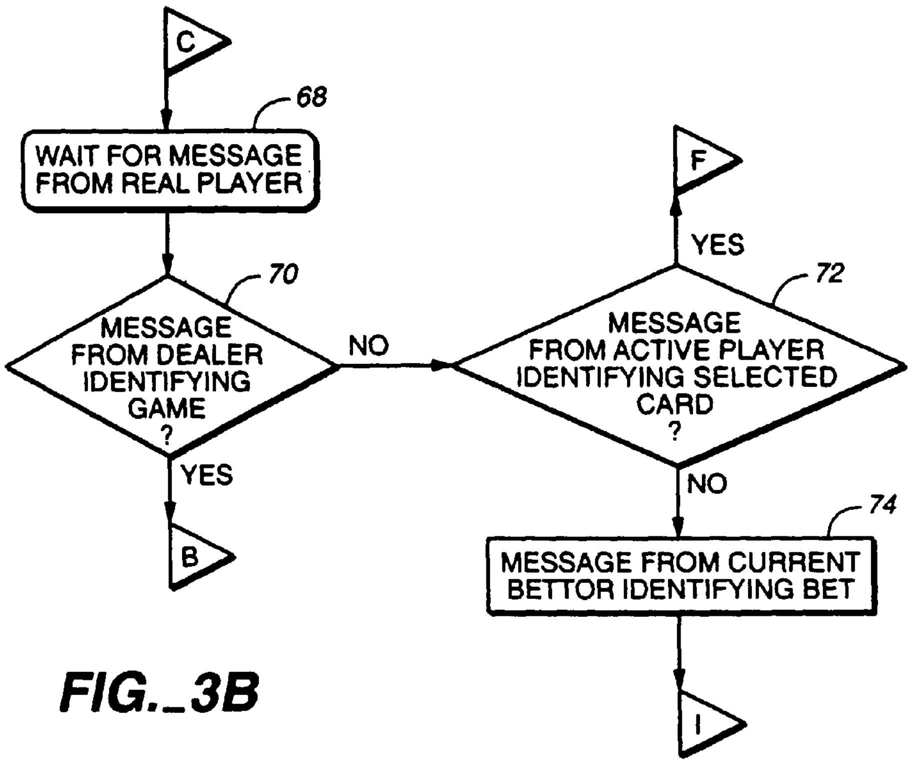
FIG. 3*b* is a flow chart showing server software operations during a session of play in accordance with the invention.

Referring to FIGS. 3*a* and 3*b*, after processing the players (steps 44, 48 and 50), the server software next determines whether the dealer is a virtual player (step 52). If so, the server software chooses the current game either by repeating the choice of the last real dealer or by random selection (step 54). If the dealer is a real player, the real player chooses the game (point C; see FIG. 3*b*). In FIG. 3*b*, the server software waits for a message from the dealer identifying the game the dealer chooses (step 68) (a time limit may be set so that if the dealer fails to choose a game within a specified period of time, the server software will select the game instead).

In this embodiment there are two game choices; five card stud and seven card stud. Five card stud has five rounds of card selection with the cards down (hidden) for the round 1 and up (showing) for rounds two through five and betting in rounds two through five. Seven card stud has seven rounds of card selection with the cards down (hidden) for rounds one and two and seven and cards up (showing) for rounds three through six and betting in rounds three through seven. Other embodiments can have other poker variations such as draw or five card high/low.

When a real player is the dealer, the associated client software queries him or her by displaying a button labeled "5 card stud" and a button labeled "7 card stud." The real player selects the game to be played and its client software sends a message to the server software identifying the current game. (See FIG. 4*a* and accompanying text.) The dealer's client software then displays the full deck of fifty-two playing cards from which the dealer will make his or her current round card selection. If a real player is not the dealer, then the associated client software waits for a message from the server identifying the current game. When the client software for a non-dealer player receives a message from the server identifying the current game, it stores and displays this information and then displays the full deck of fifty-two cards from which the player will make his or her current round card selection.

Referring again to FIG. 3*a*, once the game is selected, the server software stores this information, automatically subtracts an ante (in this case, five dollars) from each player's holdings, and prepares for the first round of play (step 56). A counter is set for the first player (step 58). The server software determines whether this player is a virtual player (step 60). If the player is a real player, a message is sent to the player identifying the game (step 62). After the message is sent, or if the player is a virtual player, the server software determines whether other players need to be contacted (step 64). If so, the player counter is incremented (step 66) and steps 60, 64, and, where necessary, 62 are repeated. After these steps have been completed, the server software then begins processing card selections for the current round (point E; see FIG. 3*c*).

Figure 3F:
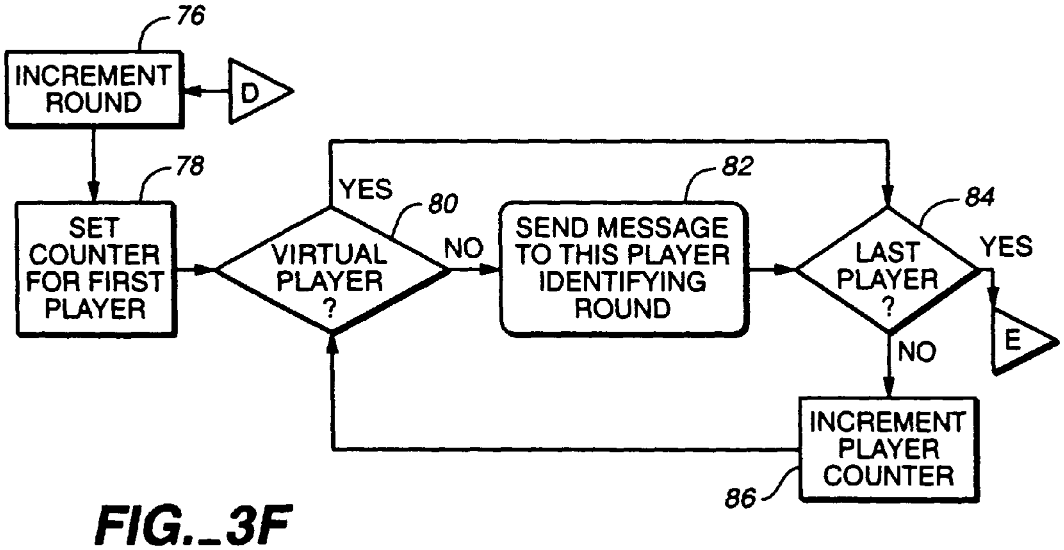
FIG. 3*f* is a flow chart showing server software operations during a session of play in accordance with the invention.
Figure 3C:
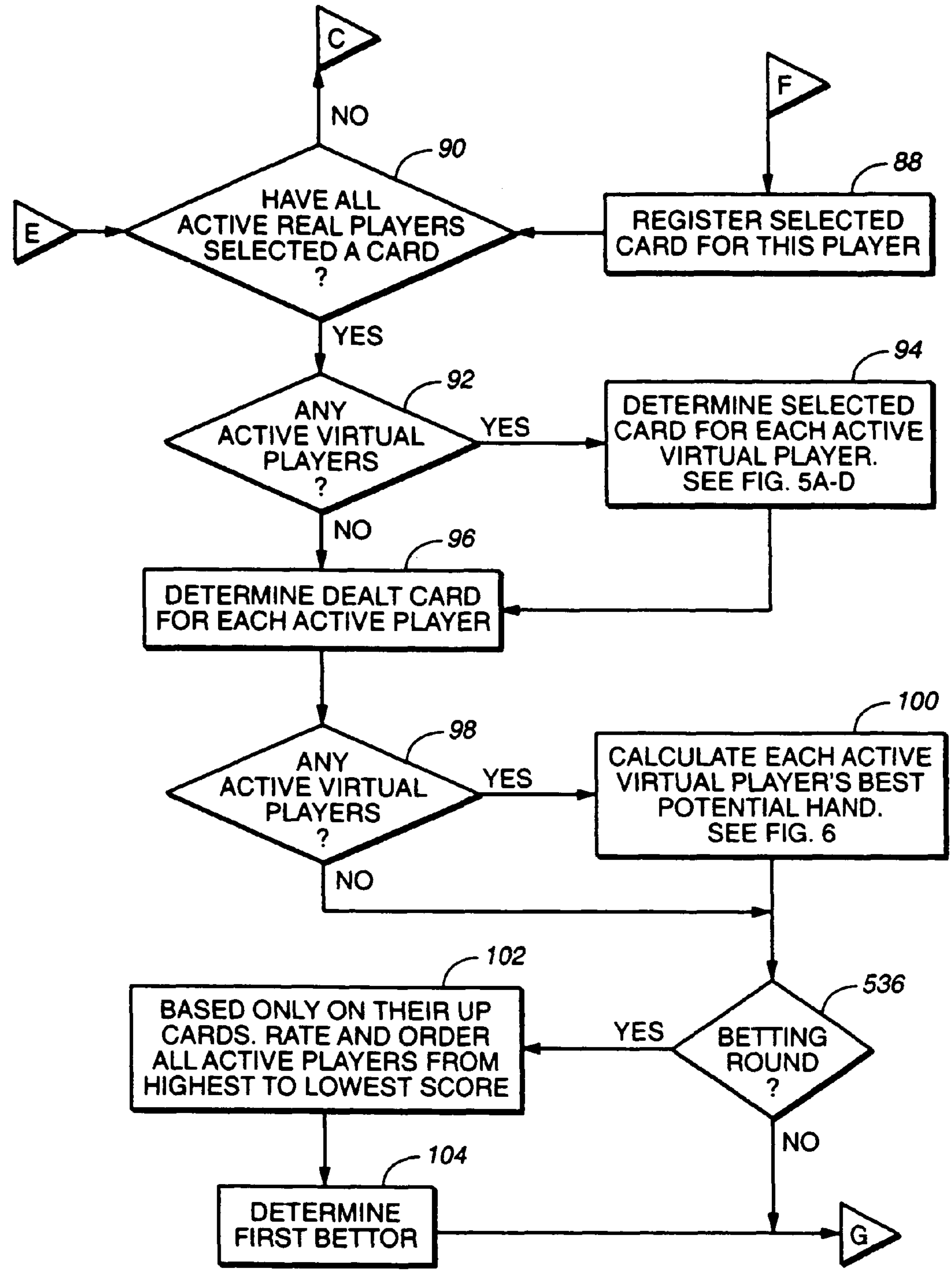
FIG. 3*c* is a flow chart showing server software operations during a session of play in accordance with the invention.

Referring now to FIG. 3*c*, the card selection process begins at point E. The server software first determines whether all active, real players have selected a card (step 90). Referring to FIG. 3*b*, step C, if all active, real players have not responded, the server software waits for a message from the real player (step 68). When the real player responds (step 72), that card selection is registered (point F; see FIG. 3*c*, step 88). A time limit may be set for a player to select a card. If a player does not choose a card within the time allotted to him or her, the server software will deal a null card to that player.

Referring again to FIG. 3*c*, once all active, real players have selected a card (step 90), the server software determines whether there are active virtual players (step 92). If there are no active virtual players, the server software determines the card to be dealt to each active player (step 96). If there are active virtual players, the server software determines the selected card for each of these players (step 94; this process will be described in more detail in FIGS. 5*a*, 5*b*, 5*c*, and 5*d* below). The server software then determines whether each active player should receive their selected card or a null card (step 96). (If the game being played is the Original version, the player receives the selected card only if the card was not previously distributed and was not chosen by another player during the current round. If One Shot is being played, the player receives the selected card only if it was not previously selected and was not chosen by another player during the current round. A null card is distributed when the player cannot receive the card he or she selected.) A special code is used in the message to indicate that an inactive player is not dealt a card.

Figure 3D:
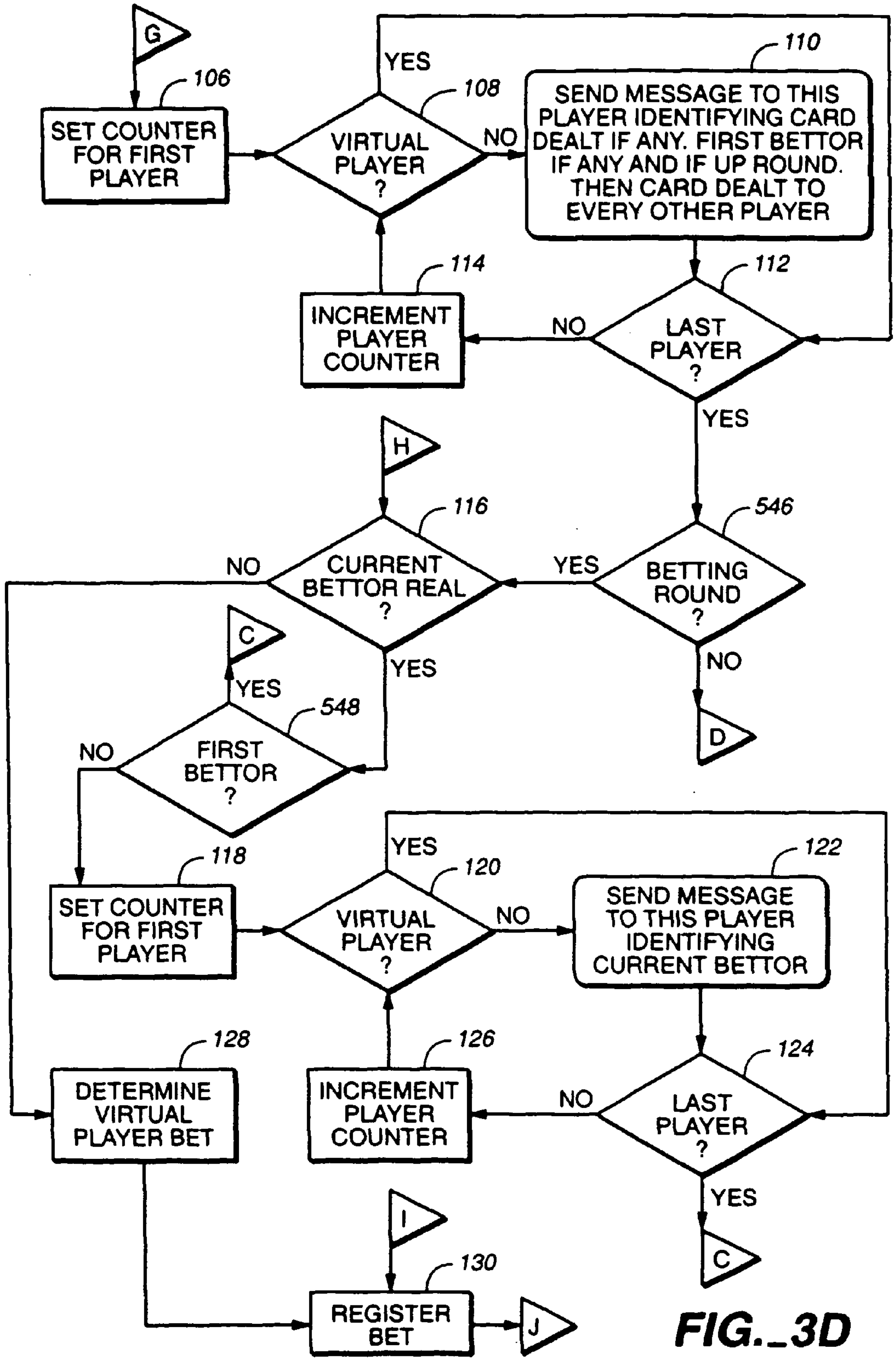
FIG. 3*d* is a flow chart showing server software operations during a session of play in accordance with the invention.

After determining which cards players should receive (step 96), the server software determines whether there are active virtual players (step 98). If there are, the server software calculates each active virtual player's best potential hand (step 100; this will be explained further in FIG. 6 below). After calculating each virtual player's best potential hand (step 100), or if there are no active virtual players (step 98), the server software determines if this is a betting round (step 536). If so, the server software rates and arranges, from highest to lowest score, all active players' hands based only on face-up cards (step 102) to determine who the first bettor is (i.e., who has the best hand) (step 104) (go to point G; FIG. 3*d*.)

Referring to FIG. 3*d*, the server software then sets a counter for the first player (step 106). If the first player is not a virtual player (step 108), the server software sends a message to the real player identifying the card dealt, the first bettor if any, and, if the card dealt is an "up card" (i.e., is dealt face-up), the card dealt to every other player (step 110). After sending this message to the real player, or if the player is a virtual player (step 108), the server software determines whether there are other players to be processed (step 112). If there are more players, the server software increments the player counter (step 114) and repeats steps 108, 112, and, where necessary, step 110. When the last player has been processed, the server software determines if this is a betting round (step 546). If not, the server software then begins processing for the next round (point D; see FIG. 3*f*). If so, the server software begins processing bets.

The server software first determines whether the current bettor is a real player (step 116). If so, the server software determines if this real player is the first bettor (step 548). If so, the server software waits for a message from the current real bettor (point C; see FIG. 3*b*) identifying the bet (step 74). A time limit for a player to bet may be set. If the player exceeds the time limit, the server software may force the player to either call or fold. If the player is not the first bettor, a counter is set for the first player (step 118). If the first player is not a virtual player (step 120), the server software sends a message to the real player identifying the current bettor (step 122). The server software then determines whether any other players need to be processed (step 124). If so, the player counter is incremented (step 126). The server software determines whether the next player is a virtual player (step 120) and steps 120, 124, and, where necessary, steps 122 and 126 are repeated. When the last player has been processed (step 124) or the first better is real (step 548), the server waits for a message from the current real bettor (point C; see FIG. 3*b*) identifying the bet (step 74). Once the current bettor has identified his or her bet, the bet is registered (point I; see FIG. 3*d*).

Figure 3E:
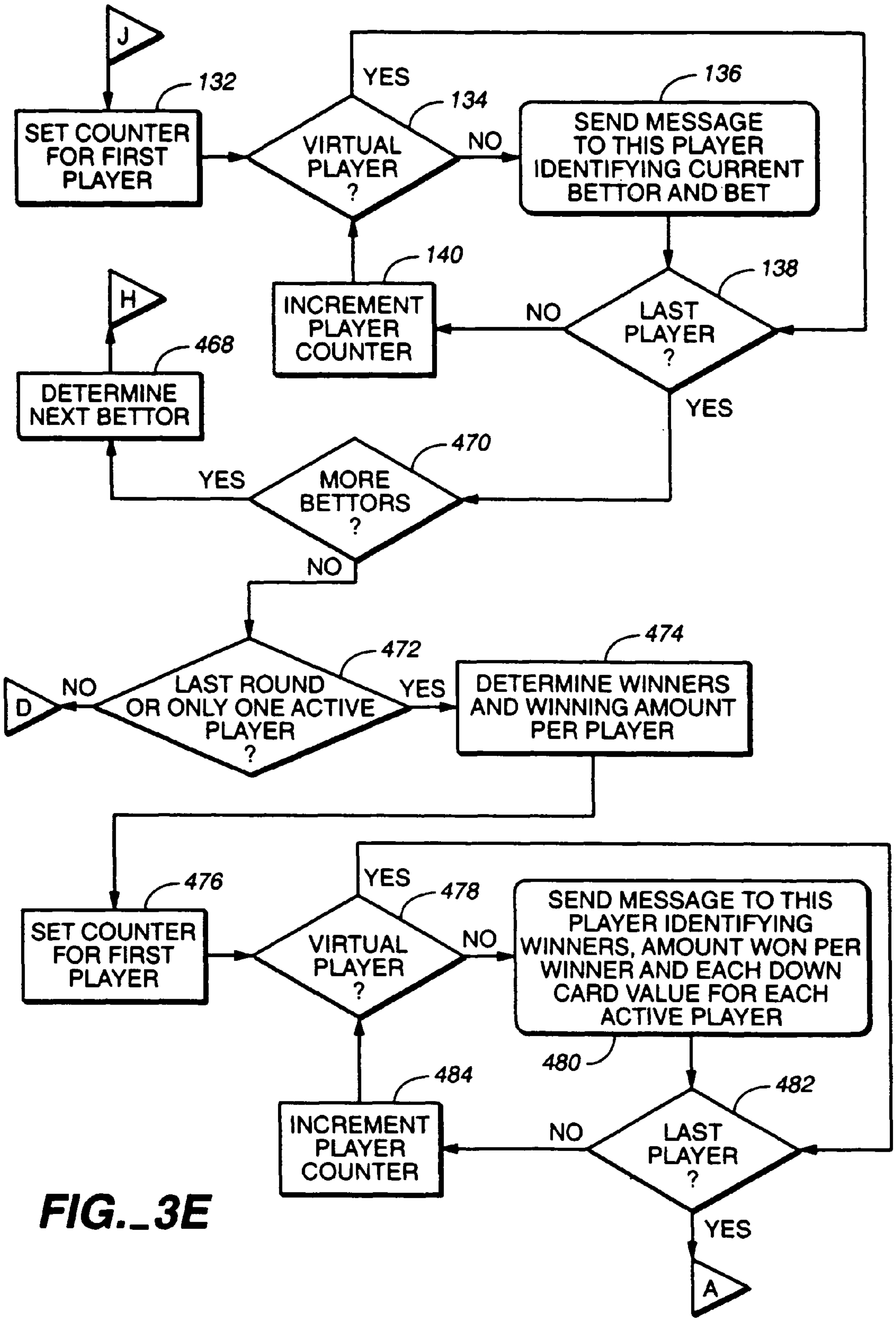
FIG. 3*e* is a flow chart showing server software operations during a session of play in accordance with the invention.

Referring again to FIG. 3*d*, if the current bettor is not a real player, the server software determines the virtual player's bet (step 128; this is discussed in greater details in FIGS. 7*a*, 7*b*, 7*c*, 7*d*, 7*e*, and 7*f* below). The server software then registers the bet (step 130) and the server software begins the process of notifying other players of the bettor and bet (point J; see. FIG. 3*e*).

In FIG. 3*e*, a counter is set for the first player (step 132). If the first player is a real player (step 134), a message is sent to the player identifying the current bettor and the bet (step 136). After the message is sent, or if the first player is a virtual player, the server software determines whether any other players need to be processed (step 138). If so, the player counter is incremented (step 140) and steps 134, 138, and, where necessary 136 and 140 are repeated. Once all the players have been processed, the server software determines whether there are any more bettors (step 470). If there are any more bettors (step 468), the server software continues to process bets (point H; see FIG. 3*d*).

If there are no more bettors, the server software determines whether the current round is either the last round or if there is only one remaining player (step 472). If either of these conditions is met, the server software determines the winner(s) based on the rules of poker and the amount each player receives (step 474). A counter is set for the first player (step 476). If the first player is a real player (step 478), the server software sends a message to the player identifying the winner (s), the amount each player has won, and each down card value for the active players (step 480). After sending the real player the message, or if the first player is a virtual player, the server software determines whether more players need to be processed (step 482). If more players do need to be processed, the player counter is incremented (step 484), and steps 478, 482, and, where necessary, steps 480 and 484 are repeated. Once all players have been processed, the server software prepares for another hand (point A; see FIG. 3*a*).

Referring again to FIG. 3*e*, if the current round is not the last round and there are two or more active players remaining (step 472), the server software increments the round number and notifies the players of the round (point D; see FIG. 3*f*, step 76).

Referring now to FIG. 3*f*, after incrementing the round number (step 76), the server software sets a counter for the first player (step 78). The server software determines whether the first player is a virtual player (step 80). If the first player is a real player, the server software sends that player a message identifying the round (step 82). After sending this message, or if the first player is a virtual player, the server software determines whether other players need to be processed (step 84). If so, the player counter is incremented (step 86) and steps 80, 84, and, where necessary, steps 82 and 86 are repeated. Once the last player has been processed, the server software proceeds with card selection for that round (point E; see FIG. 3*c*) (see above for a detailed description of this process).

With regard to FIG. 4*a*, at the start of the session (step 486), the client software initializes variables (step 488). The client software then waits for a message from the server software identifying the dealer (step 490). Once the message is received from the server software (step 492), the client software registers and displays the identity of the dealer to the player (step 494). If the player associated with the particular instance of client software is the dealer (step 496), the player selects the game (step 498). The client software then sends a message identifying the chosen game to the server software (step 500). If the dealer is another player (step 496), the client software waits for a message from the server software identifying the game (step 490). Upon receiving the message, the client software registers and displays the game type to the player (step 504).

Once the game type has been chosen, the player selects a card (step 502) and the client software sends a message indicating which card this player selected to the server software (step 534). In this embodiment when a real player clicks on a card its client software offsets that card in the displayed deck and if a previous card had been displayed offset, the client software then returns the previous offset card to its original position in the displayed deck. To indicate the actual card selection decision for the current round each real player clicks the button labeled “Card selected”. When a real player clicks the “Card selected” button its client software then sends a message to the server identifying the selected card for that player and then waits for a message from the server identifying dealt cards and which player is the current bettor. If the current round is a down round meaning that each player should not know what card each of the other players have been dealt, then the server software message to each real player only identifies the card dealt to that player. However, if the current round is an up round, then the server software message to each real player identifies the card dealt to each active player. When each real player’s client software receives the card selection message from the server software, it stores and displays that information.

Figure 4B:
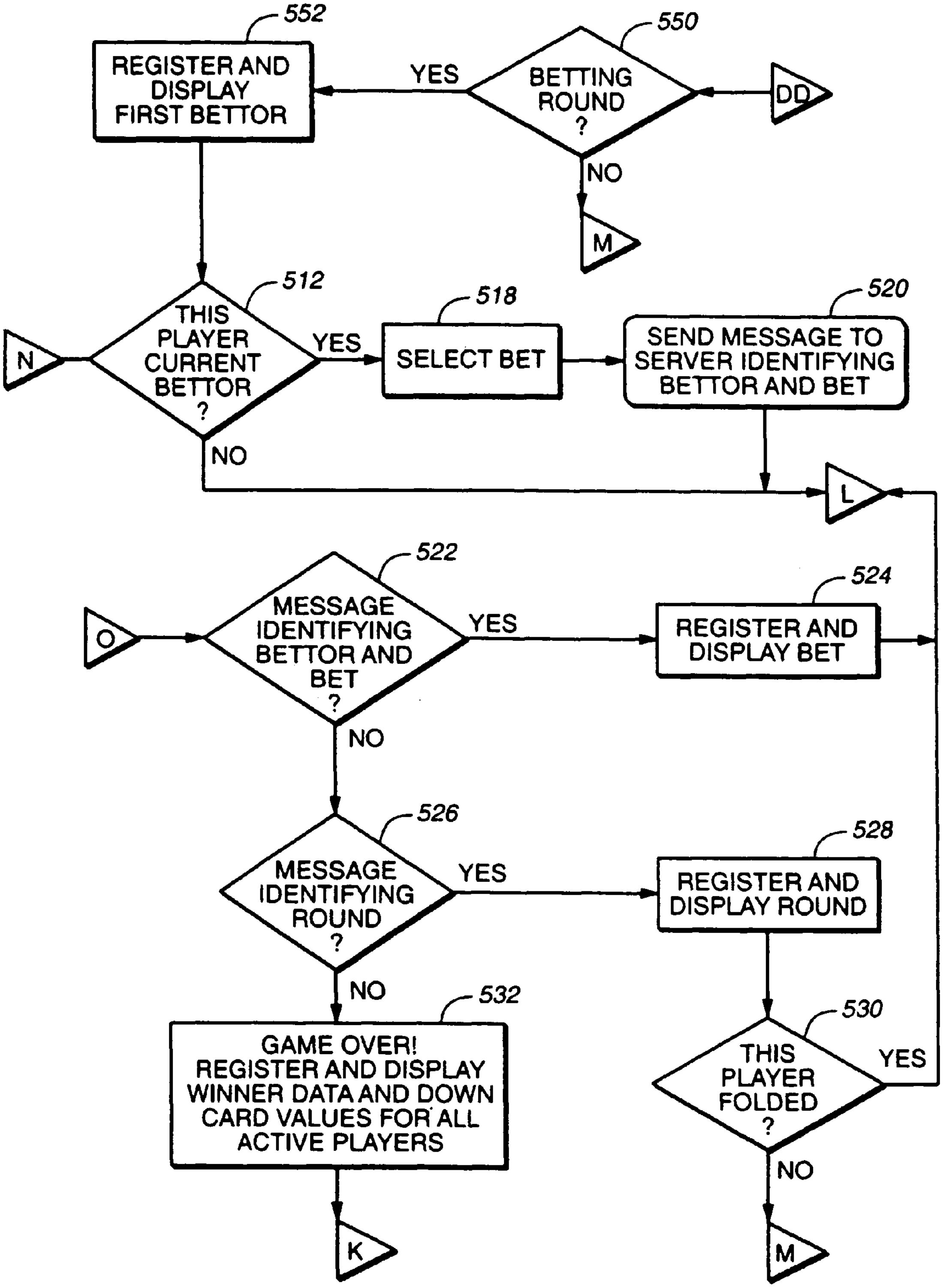
FIG. 4*b* is a flow chart showing client software operations in accordance with the invention.

After sending the card selection to the server (step 534), the client software waits for a message from the server (step 490) indicating what card the player will receive, the identity of the first bettor if any, and, if face-up cards are distributed during the current round, the cards received by the other players (step 508). Once this message is received, the client software registers and displays the dealt cards (step 510) and then determines if this is a betting round (point DD; see FIG. 4*b*). Referring to FIG. 4*b*, if this is not a betting round, then the client software gets ready for the player to select a card (point M; see FIG. 4*a*). If this is a betting round, then the client software registers and displays the identity of the first bettor (step 552). The client software then determines whether its player is the current bettor (step 512).

If the player associated with the particular instance of client software is the current bettor (step 512), the player places the bet (step 518) after which the client software sends a message to the server software identifying the bet (step 520). In this embodiment, the client software displays six buttons, each labeled for one of the six betting options: check, call, $5, $10, $25, fold, and a seventh button labeled “Bet.” (A bettor checks when no one else has made a money bet on the current round and he or she stays in the game but passes betting on to the next active player without making a money bet. A bettor calls when there have been one or more previous money bets that the player must match to stay in the game and does so without raising the called bet and then passes on betting to the next active player. $5, $10 and $25 are the amounts of virtual money any player may bet or raise on his or her turn. When a player folds he or she cannot win and becomes inactive for the current game. When a player folds it means that player no longer bets, selects a card, or is dealt a card for the remainder of the current game. In this embodiment the number of money bets in a round is limited to an initial money bet plus two raises. Other embodiments may set the bet amounts to other fixed values, any amount no greater than the size of the current pot or to any value. Other embodiments may also change the number of permissible raises.) The player clicks on the desired betting option and then clicks “Bet” to indicate their betting decision (step 518). When “Bet” is clicked, the player’s client software sends a message to the server software identifying the current bettor and the bet (step 520). The client software then waits for a message from the server software (point L; see FIG. 4*a*).

In addition to the messages from the server software described above, the client software may receive other messages from the server software. Referring to FIG. 3*f*, the server software may send messages to real players identifying the round (step 82). With reference to FIGS. 3*d* and 3*e*, the server software may also send messages to real players identifying the current bettor (step 122), identifying the current bettor or bet (step 136), or identifying the winner(s) of the round, the amount won, etc. (step 480).

Referring again to FIG. 4*a*, the client software may receive a message from the server software identifying the bettor during a round of betting (step 516). When this happens, the client software registers and displays the bettor (step 514). The client software then determines whether its player is the current bettor (point N; see FIG. 4*b*).

Referring now to FIG. 4*b*, if the player associated with the particular instance of client software is the bettor (step 512), the player places the bet (step 518) after which the client software sends a message to the server software identifying the bettor and bet (step 520). The client software then waits for another message from the server software (point L; see FIG. 4*a*).

Referring again to FIG. 4*a*, if the message from the server software does not identify the cards dealt (step 508), the first bettor (step 508), or the current bettor (step 516), the client software continues to check the content of the message (point O; see FIG. 4*b*).

Referring to FIG. 4*b*, if the message from the server software identifies the bettor and the bet (step 522), the client software registers and displays the bet (step 524) and waits for another message from the server software (point L; see FIG. 4*a*).

Again referring to FIG. 4*b*, if the message from the server software identifies the round (step 526), the client software registers and displays the round to the player (step 528). The client software then determines whether this player has folded (step 530). If the player has folded, the client software waits for a message from the server software indicating a new round of play (point L; see FIG. 4*a*). If the player has not folded, the player selects a card (point M; see FIG. 4*a*).

The message from the server software may also indicate the end of the hand (step 532). If this is the case, the client software displays the information from the server about the winner(s) and winnings. The client software then prepares for the next hand (point K; see FIG. 4*a*).

Figure 5A:
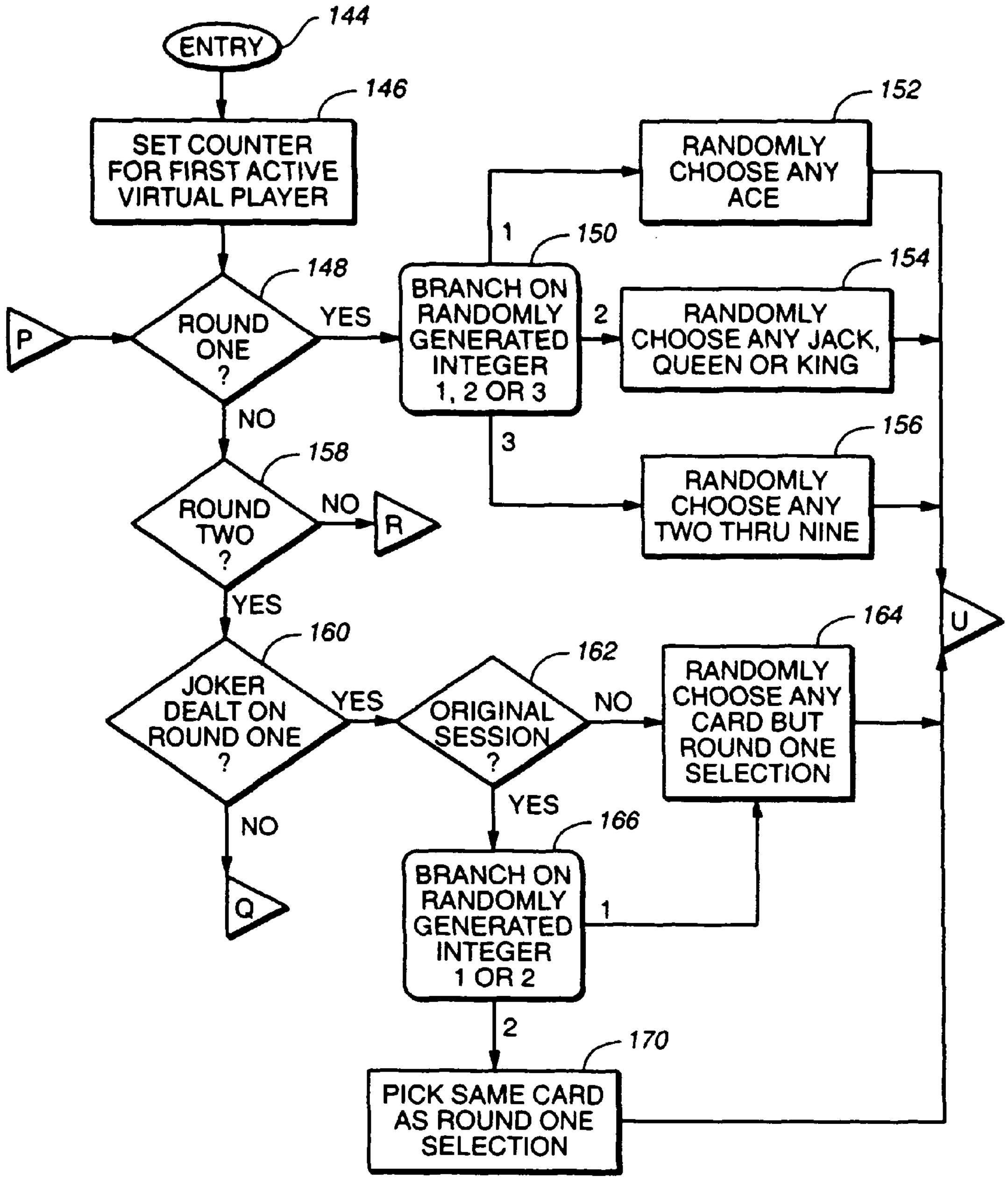
FIG. 5*a* is a flow chart showing how the server software chooses cards for virtual players during the first and second rounds of play in accordance with the invention.

In FIG. 5*a*, the server software begins to determine what cards the virtual players should select (step 144) by setting a counter for the first active virtual player (step 146). (This process was first referred to in FIG. 3*c*, step 94.) The server software first determines whether the current round is the first round (step 148). If the current round is the first round, the server software randomly generates an integer (1, 2, or 3) to choose a card for the player to select (step 150). If the generated integer is 1, the virtual player will randomly select any ace (step 152). If the generated integer is 2, the virtual player will randomly select a face card (step 154). If the generated integer is 3, the virtual player will randomly select any card except an ace or a face card (step 156). The server software then determines if there are other active virtual players that need to select cards (point U; see FIG. 5*d*).

Referring again to FIG. 5*a*, when choosing cards for virtual players to select in the second round (step 158), the server software first determines whether the player received a null card in the first selection round (step 160). If a null card was received, the server software next determines the session being played: "One Shot" or "Original" (step 162). If One Shot is being played, the virtual player can randomly choose any card but the previous selection (step 164). If the session is the Original version, the server software randomly generates an integer (1 or 2) (step 166). If 1 is generated, the virtual player can randomly choose any card but the previous selection (step 164). If 2 is generated, the virtual player picks the same card as in the first round (step 170). The server software then determines if there are other active virtual players that need to select cards (point U; see FIG. 5*d*).

Figure 5B:
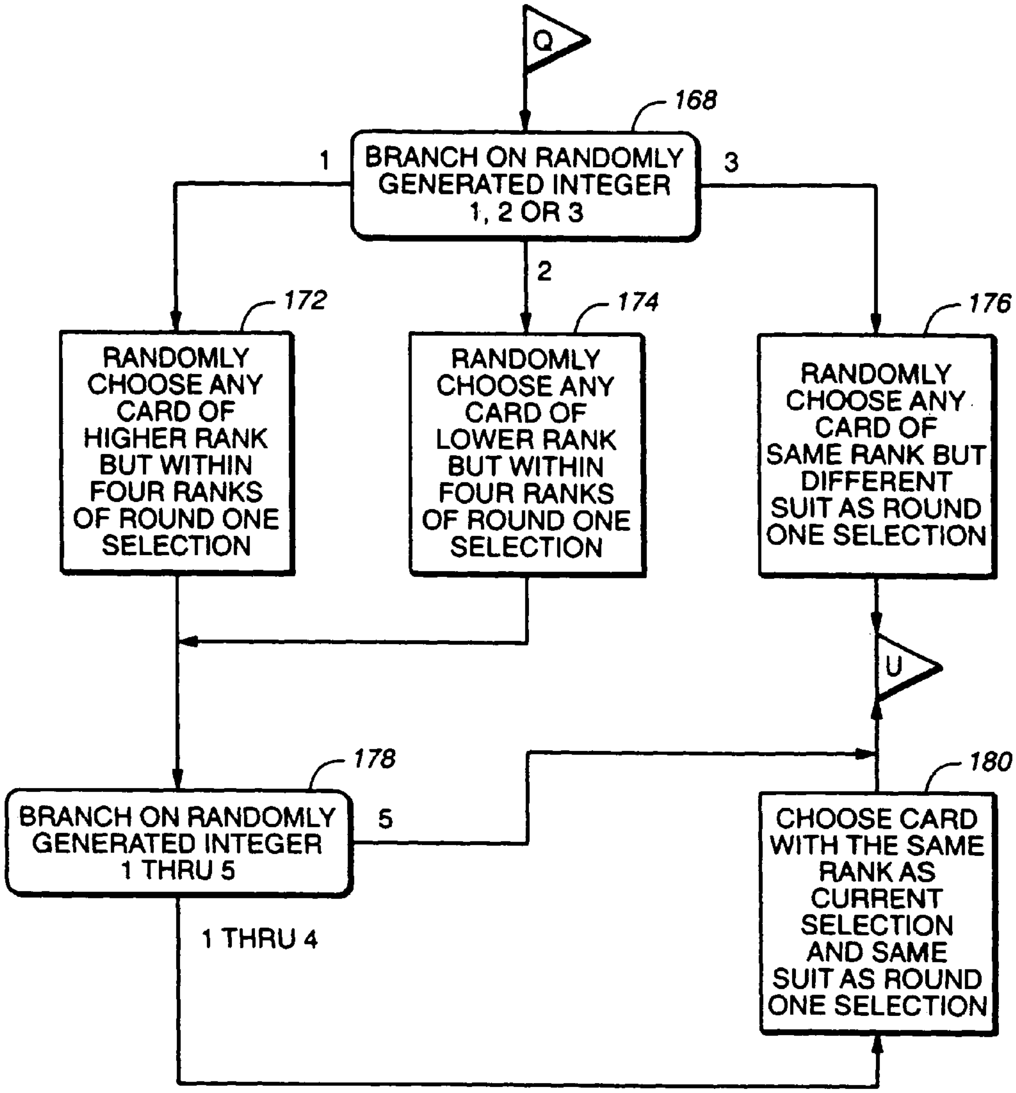
FIG. 5*b* is a flow chart showing how the server software chooses cards for virtual players during later selection rounds in accordance with the invention.

Referring to FIG. 5*a*, in choosing a card in the second round, if a null card was not received in the first round, the server software begins generating random numbers to determine which card the virtual player should choose (point Q; see FIG. 5*b*).

In FIG. 5*b*, the server software randomly generates an integer (1, 2, or 3) (step 168). If 1 is generated, any card of a higher rank that is within four ranks of round one's selection is randomly chosen (step 172). The server software then randomly generates an integer (1, 2, 3, 4, or 5) (step 178). If 1, 2, 3, or 4 is generated, a card with the same rank as the current selection and the same suit as round one's selection is chosen (step 180). Otherwise, the card chosen in step 172 is selected. If after step 168 is performed, 2 is generated, any card of a lower rank that is within four ranks of round one's selection is randomly chosen (step 174). The server software then randomly generates an integer (1, 2, 3, 4, or 5) (step 178). If 1, 2, 3, or 4 is generated, a card with the same rank as the current selection and the same suit as round one's selection is chosen (step 180). Otherwise, the card chosen in step 172 is selected. If after step 168 is performed, 3 is generated, any card of the same rank but different suit as the round one selection is chosen (step 176). The server software then determines if there are other active virtual players that need to select cards (point U; FIG. 5*d*).

Figure 5C:
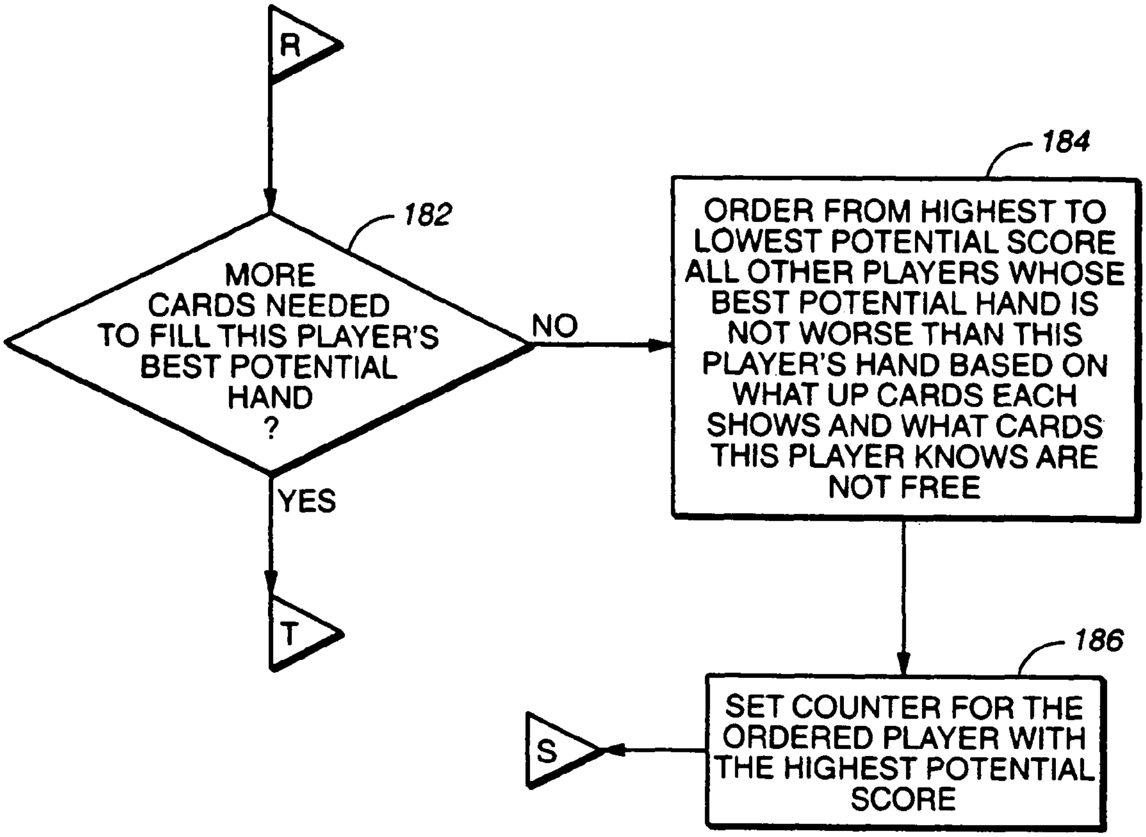
FIG. 5*c* is a flow chart showing how the server software chooses cards for virtual players during later selection rounds in accordance with the invention.
Figure 5D:
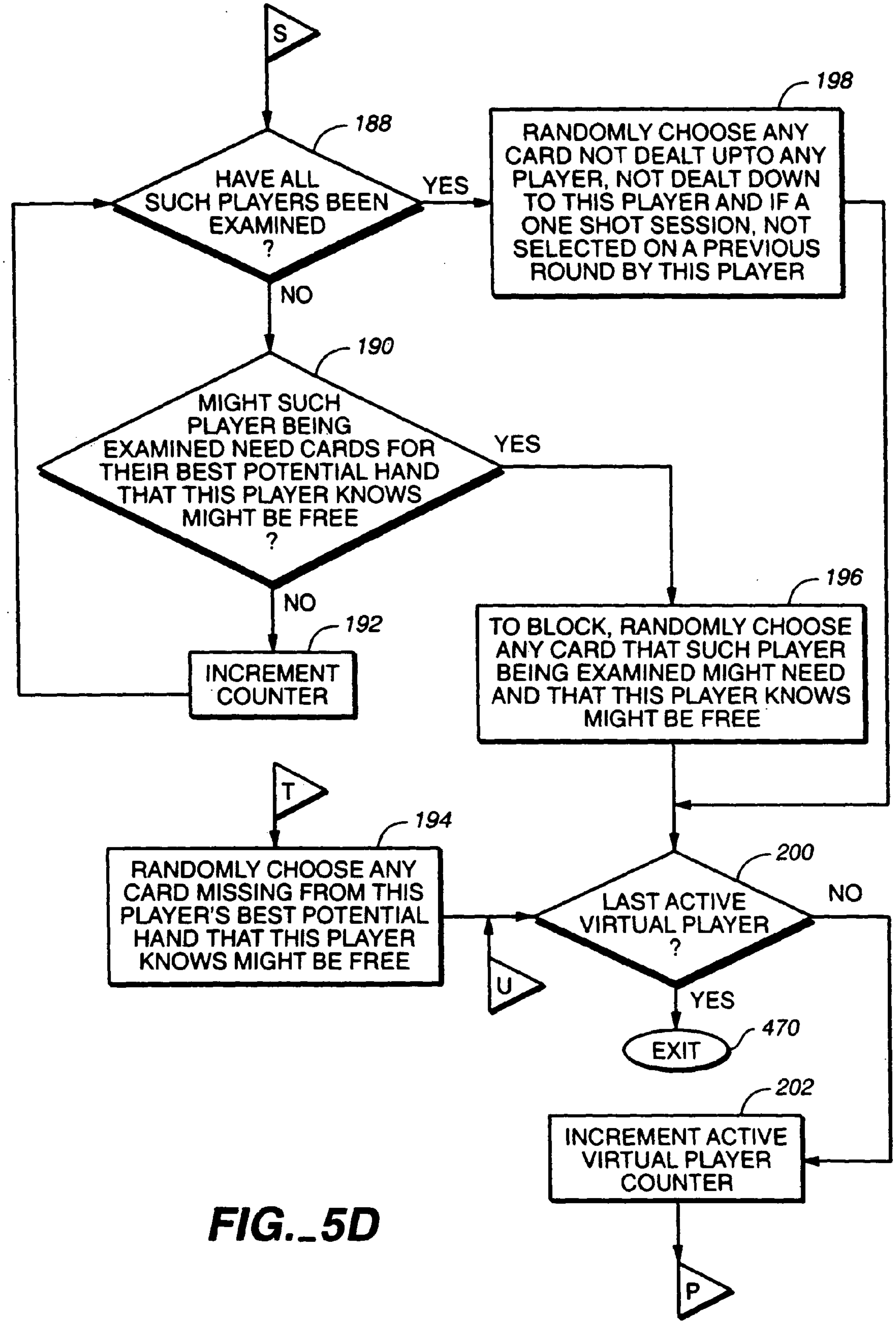
FIG. 5*d* is a flow chart showing how the server software chooses cards for virtual players during later selection rounds in accordance with the invention.

Referring now to FIGS. 5*a*, 5*b*, 5*c*, and 5*d*, if the current round is neither the first or second round, the server software moves to point R (see FIG. 5*c*) to determine the cards the virtual players should select. In FIG. 5*c*, subsequent selection round strategy for virtual players begins with the server software determining whether more cards are needed to fill the virtual player's best potential hand (step 182) (for a discussion of how the best potential hand is calculated, please see FIG. 6 and accompanying text below). If so (point T; see FIG. 5*d*), the server software will randomly choose any card missing from the virtual player's best potential hand that the virtual player "knows" might be free (FIG. 5*d*, step 194). The server software will then determine whether there are other active virtual players that need to select cards (step 200).

Referring now to FIG. 5*c*, if no more cards are needed for the virtual player's best potential hand (step 182), the server software arranges in order the other players whose best potential hand could beat the virtual player's hand (step 184). The players are arranged from highest to lowest potential score and the determination is based on the face-up cards and the cards the virtual player knows are not free. A counter is set for the ordered opponent with the highest potential score (step 186). Each player is then examined (point S; see FIG. 5*d*).

In FIG. 5*d*, the server software first determines whether each opponent with a potentially higher score has been examined to see if it is possible to block that opponent (step 188). If not, the server software then determines whether the opponent with a potentially better hand is missing cards that the virtual player knows might be free (step 190). If the player can be blocked, the server software randomly chooses any card that this player might be missing and the virtual player knows might be free (step 196). If the player cannot be blocked, the opponent counter is incremented (step 192) and the server software returns to the loop starting with step 188.

If all players have been examined (step 188) and it has been determined that none of the players can be blocked, the server software randomly chooses for the virtual player a card which has not been dealt face-up to any player, dealt face-down to this player, and, if the current session is a One-Shot session, has not been selected on a previous round by this player (step 198). The server software will then determine whether there are other active virtual players that need to select cards (step 200).

If all active virtual players have selected cards (step 200), the server software will end the card selection process for virtual players (step 470) and determine the dealt card for each active player (see FIG. 3*c*, step 96). If there are still active virtual players who need to select cards (step 200), the server software will increment the virtual player counter (step 202) and select a card for the next virtual player (point P; see FIG. 5*a*).

Figure 6:
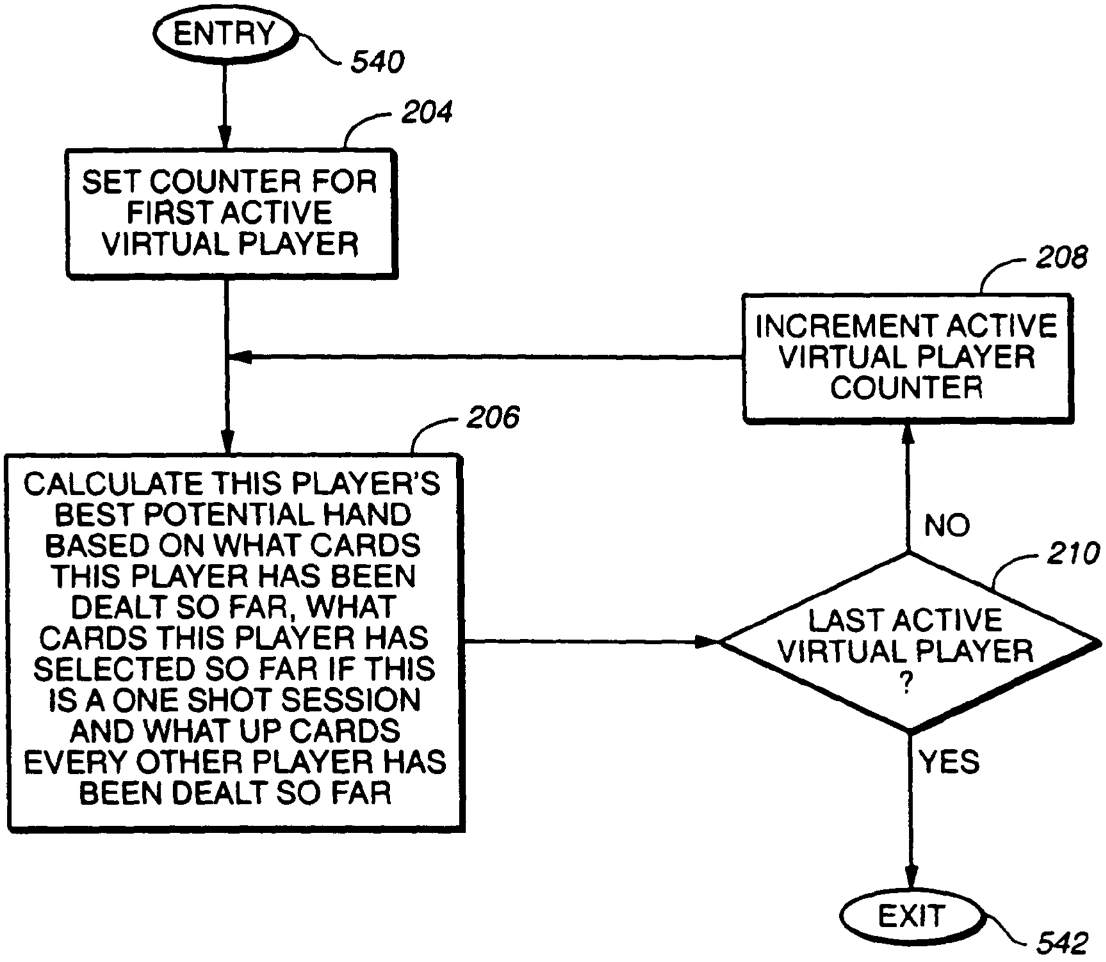
FIG. 6 is a flow chart showing how the server software calculates the best potential hand of a virtual player.

In FIG. 6, the server software begins (step 540) determining the virtual player's best potential hand by setting a counter for the first active virtual player (step 204). (The server software uses the calculations of the virtual player's best potential hand to determine which card to pick (see FIG. 5*c*) and how to bet (see FIGS. 7*a*, 7*b*, 7*c*, 7*d*, 7*e*, 7*f*, and 7*g*). The server software then calculates the player's best potential hand based on the cards dealt to the player, the face-up cards for other players, and, if the current session is a One-Shot session, what cards the player has selected (step 206). The server software then determines whether the other virtual players need to be processed (step 210). If so, the server software increments the active virtual player counter (step 208) and re-enters the loop beginning at step 206. If all virtual players have been processed, the server software is finished calculating best potential hands for this round (step 542).

Figure 7A:
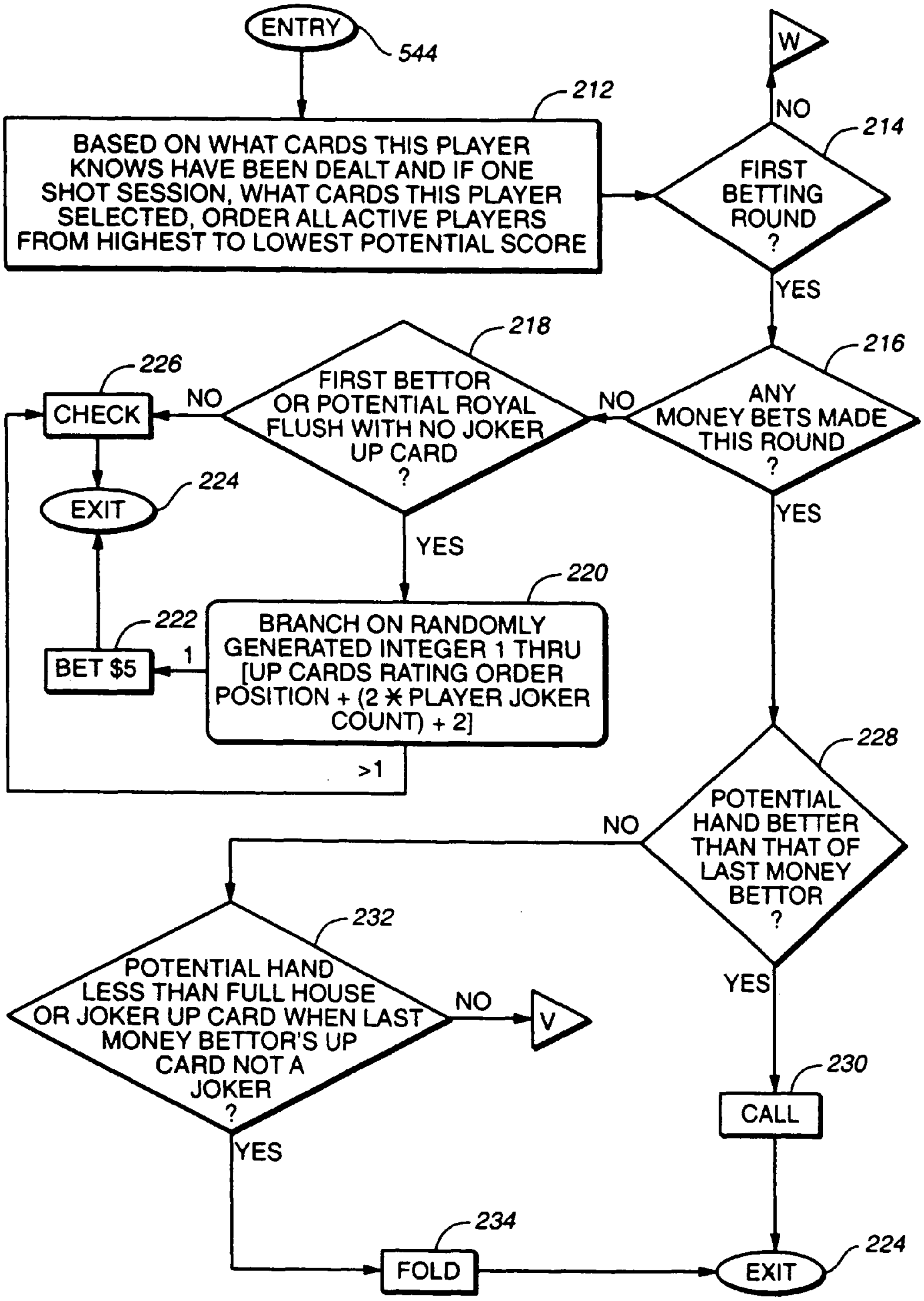
FIG. 7*a* is a flow chart showing how the server software determines a bet for a virtual player during the first betting round in accordance with the invention.
Figure 7B:
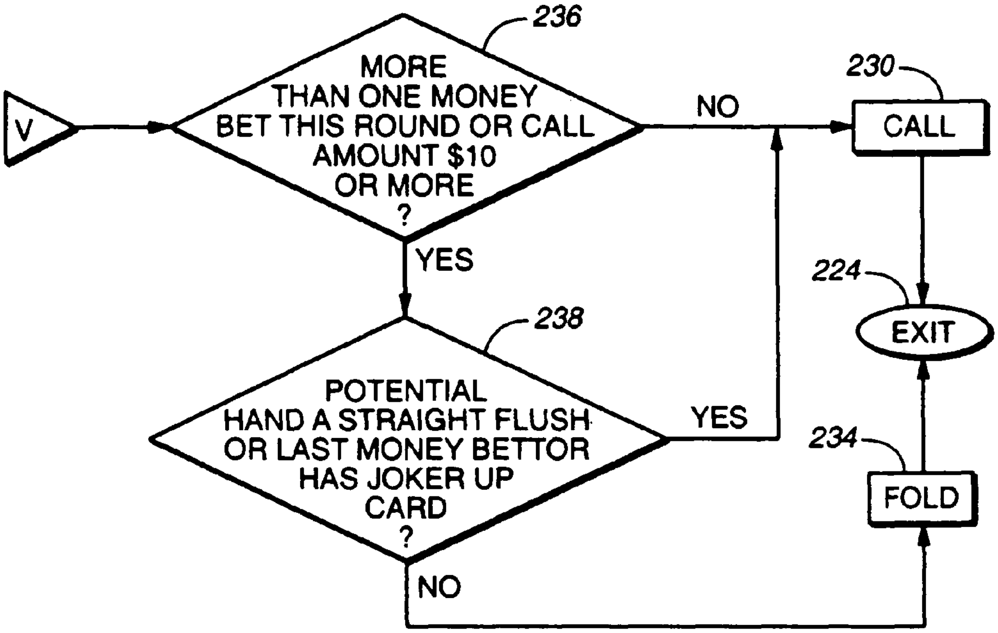
FIG. 7*b* is a flow chart showing how the server software determines a bet for a virtual player during the second betting round in accordance with the invention.

With regard to FIG. 7*a*, when determining a virtual player's bet (see step 128, FIG. 3*d*), the server software begins (step 544) by arranging all active players from highest to lowest potential score based on what cards this player knows have been dealt and if One-Shot session, what cards this player has selected (step 212). The server software then determines whether the current betting round is the first betting round (step 214). If it is not the first betting round, the server software then determines whether it is the second betting round (point W; see FIG. 7*g*). If it is the first betting round, the server software then determines whether money bets have been made during the round (step 216). If money bets have been made, the server software determines whether the virtual player's potential hand is better than the last money bettor's (step 228). If so, the virtual player calls (step 230). If the virtual player's potential hand is not better than the previous bettor's, the server software then determines if the virtual player's potential hand is less than a full house or if the virtual player has a null card showing when the previous bettor does not have a null card showing (step 232). If either of these conditions is met, the virtual player folds (step 234). If the conditions of step 232 are not met, the server software then determines (point V; see FIG. 7*b*) whether more than one money bet was made during the current round or if the call amount is ten virtual dollars or more (step 236). If not, the virtual player will call (step 230). However, if these conditions are met, the server software determines whether the virtual player's potential hand could be a straight flush or if the last money bettor has a null card showing (step 238). If the answer to either of these queries is "yes," the virtual player calls (step 230). If the answer is "no," the virtual player folds (step 234).

Referring again to FIG. 7*a*, if no money bets have been made during the current round (step 216), the server software determines whether the virtual player is the first bettor or possesses a potential royal flush with no null cards showing (step 218) If neither of these conditions is met, the virtual player checks (step 226). If either of these conditions is met, the software randomly generates an integer (here, 1 through face-up card rating order position+2*number of null cards+2) (step 220). (The face-up card rating order position is a ranking of the quality of players' hands based on the cards showing. The best potential hand is "1," the second-best is "2," etc.) If 1 is generated, the virtual player bets five virtual dollars (step 222). If a number greater than one is generated, the virtual player will check (step 226). Once the server software has determined the virtual player's betting action, the server software exits this routine (step 224).

Figure 7G:
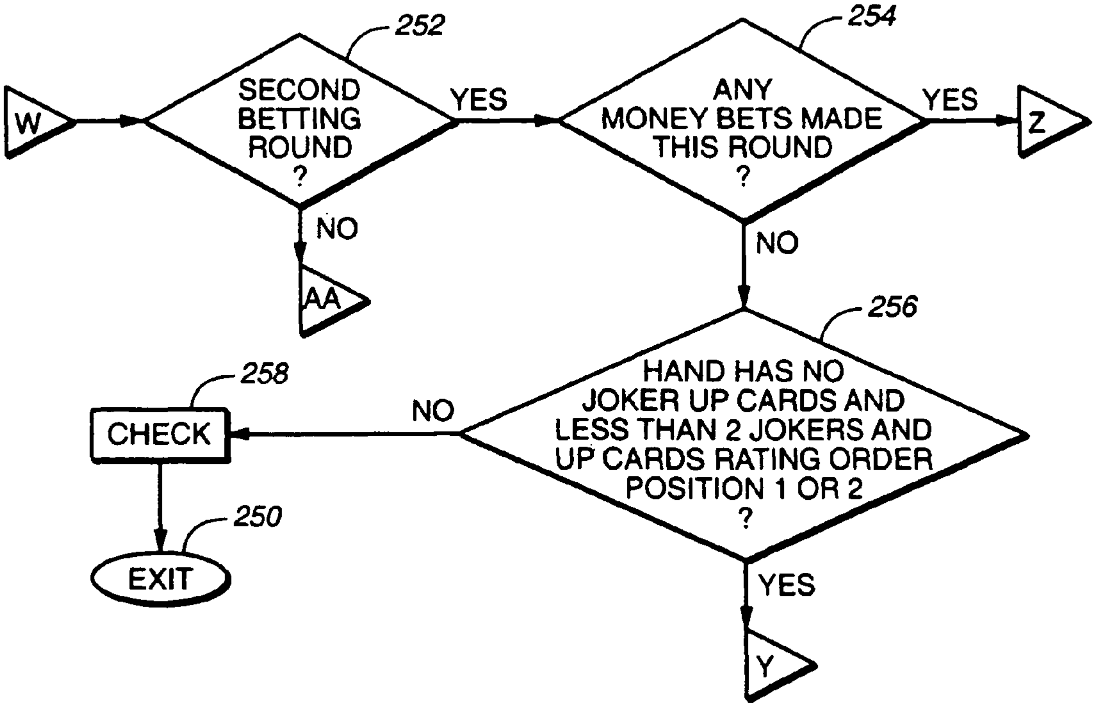
FIG. 7*g* is a flow chart showing how the server software makes decisions in response to a bet during the second betting round in accordance with the invention.

In FIG. 7*g*, the server software determines whether the current betting round is the second betting round (step 252). If not, the server software determines the betting round (point AA; see FIG. 5*d*). If the current betting round is the second betting round, the server software determines whether money bets have been made during the current round (step 254). If money bets have been made, the server software determines whether the virtual player's potential hand is better than the last money bettor's (point Z; see FIG. 7*c*).

Figure 7C:
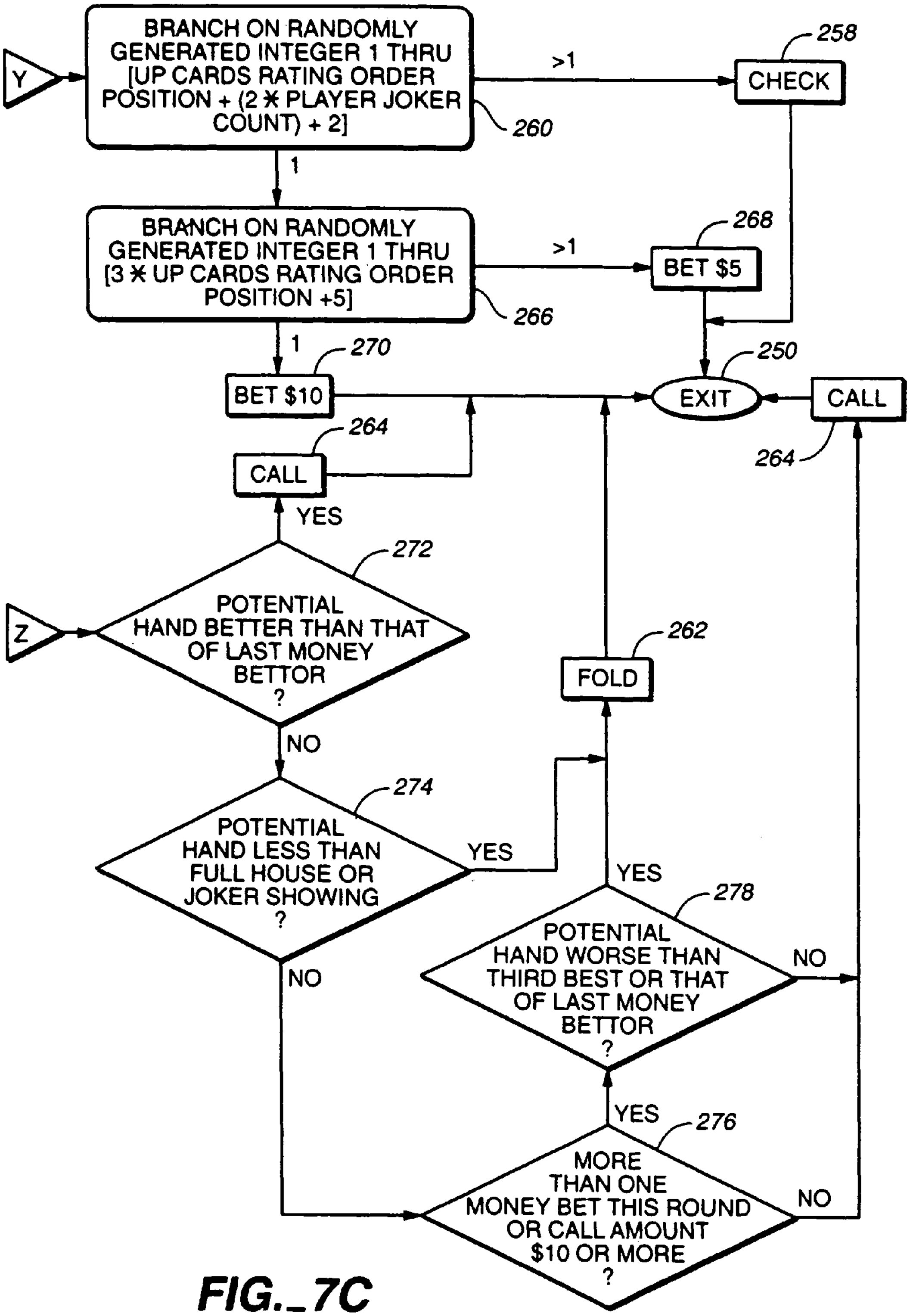
FIG. 7*c* is a flow chart showing how the server software determines a bet for a virtual player during later betting rounds in accordance with the invention.

Referring to FIG. 7*c*, the virtual player calls when the potential hand is better than the last money bettor's (step 264). If not, the server software then determines whether the virtual player's potential hand is less than a full house or the virtual player has a null card showing (step 274). If so, the virtual player folds (step 262). If not, the server software determines whether there has been more than one money bet during the current round or if the call amount is ten virtual dollars or more (step 276). If the answer to either of these questions is "yes," the software determines whether the virtual player's potential hand is either worse than the last money bettor's or is no better than fourth best of all the hands (step 278). If the answer to either of these questions is "yes," the virtual player folds (step 262). If the answer to both of these questions is "no," the virtual player calls (step 264).

Referring again to FIG. 7*g*, if no money bets have been made during the second betting round (step 254), the server software checks to see if the virtual player has no null cards showing, and has less than two null cards total, and the up-card rating order position is less than three (step 256). If not, the virtual player checks (step 258). If these conditions are satisfied (point Y; see FIG. 7*c*), the server software will randomly generate an integer 1 through (up-cards rating order position+2*number of null cards+2) (step 260). If an integer greater than 1 is generated, the virtual player checks (step 258). If the integer generated is 1, the server software randomly generates an integer ranging from 1 to (3*[up-cards rating order position]+5) (step 266). If 1 is generated, the virtual player bets ten virtual dollars (step 270). If an integer greater than 1 is generated, the virtual player bets five virtual dollars (step 268). Once the server software has determined the virtual player's betting action, the software exits this routine (step 250).

Figure 7D:
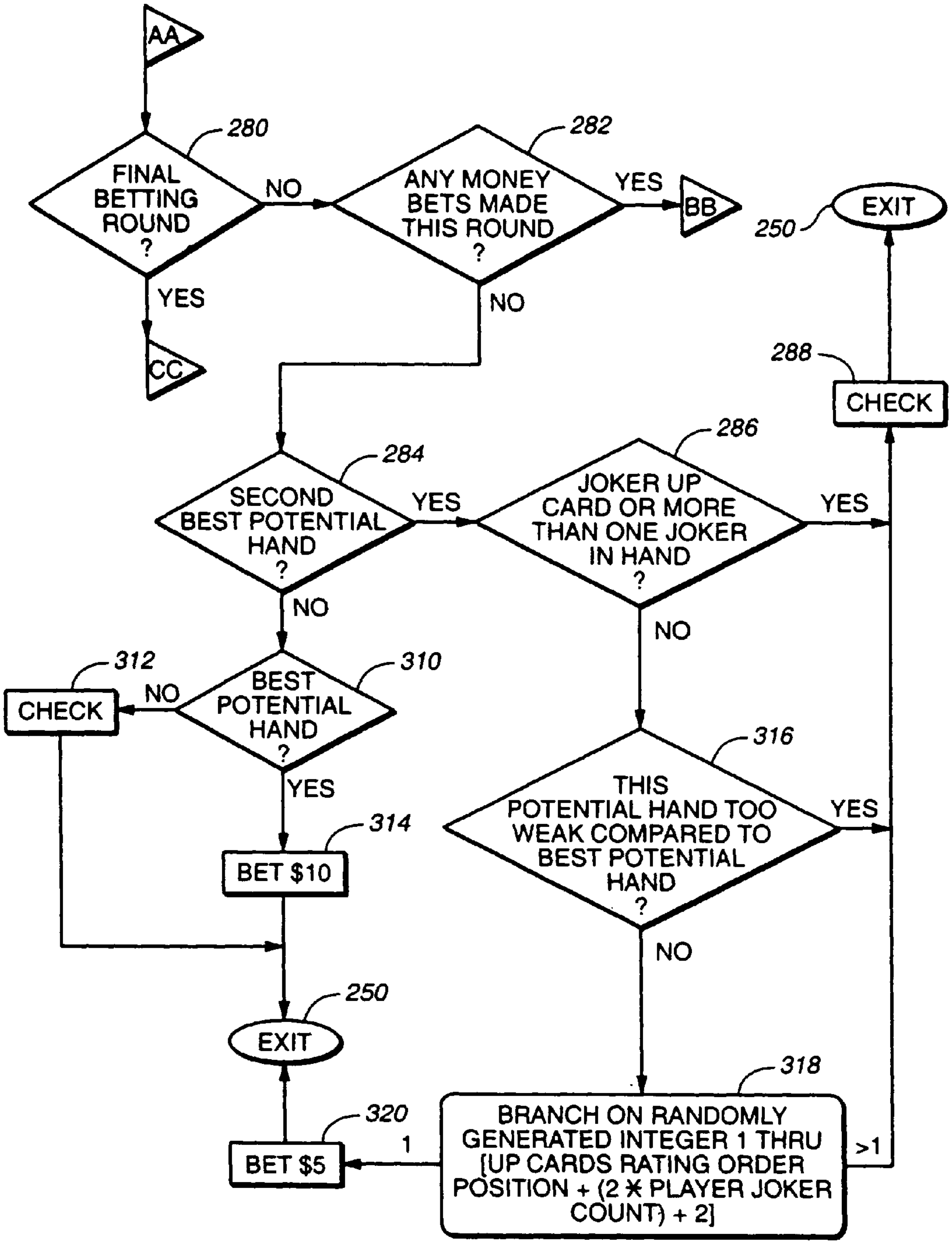
FIG. 7*d* is a flow chart showing how the server software determines a bet for a virtual player during the final betting round in accordance with the invention.
Figure 7E:
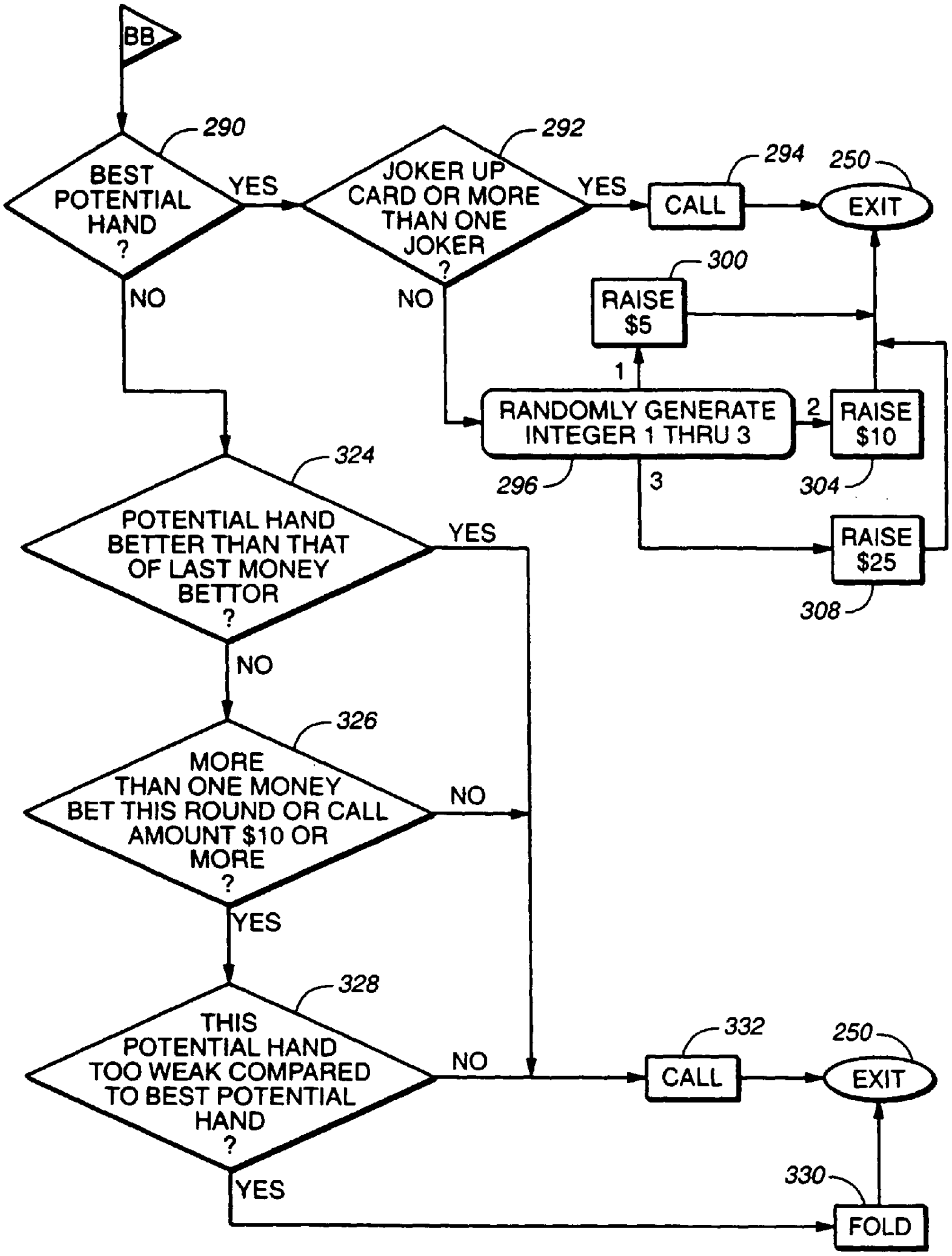
FIG. 7*e* is a flow chart showing how the server software determines a bet for a virtual player during the final betting round in accordance with the invention.

In FIG. 7*d*, the server software determines whether the current betting round is the final betting round (step 280). If not, the server software determines whether money bets have been made during the current round (step 282). If money bets have been made, the server software determines (point BB; see FIG. 7*e*) whether the virtual player possesses the best potential hand among all the players (step 290). If so, the server software then determines whether the virtual player has any null cards showing or more than one null card (step 292). If so, the virtual player calls (step 294). If not, the server software randomly generates an integer between one and three (step 296). If 1 is generated, the virtual player raises the bet by five virtual dollars (step 300). If 2 is generated, the virtual player raises the bet by ten virtual dollars (step 304). If 3 is generated, the virtual player raises the bet by twenty-five virtual dollars (step 308).

If the virtual player does not possess the best potential hand (step 290), the server software determines whether the player's potential hand is better than the last money bettor's (step 324). If it is, the virtual player calls (step 332). If not, the server software reviews whether there has been more than one money bet during the current round or whether the call amount is ten virtual dollars or more (step 326). If the answers to both these questions are "no," the virtual player calls (step 332). If the answer to either of these questions is "yes," the server software determines whether the virtual player's potential hand is too weak to beat an opponent's best potential hand (step 328). If the hand is too weak, the virtual player folds (step 330). If the hand is not too weak, the virtual player calls (step 332).

Referring again to FIG. 7*d*, if no money bets have been made during the round, the server software determines whether the virtual player possesses the second best potential hand among the players (step 284). If not, the server software assesses whether the virtual player possesses the best potential hand of the players (step 310). If not, the virtual player checks (step 312). If the virtual player does possess the best potential hand, the virtual player bets ten virtual dollars (step 314).

If the virtual player does possess the second best potential hand of all the players, the server software determines whether the virtual player has any null cards showing or more than one null card (step 286). If so, the virtual player checks (step 288). If not, the server software determines whether the potential hand is too weak to beat the best potential hand (step 316). If it is, the virtual player checks (step 288). If not, the server software randomly generates an integer between 1 through (up-cards rating order position+2*number of null cards+2) (step 318). If an integer greater than 1 is generated, the virtual player checks (step 288). If 1 is generated, the virtual player bets five virtual dollars (step 320). Once the server software has determined the virtual player's betting action, the server software exits this routine (step 250).

Figure 7F:
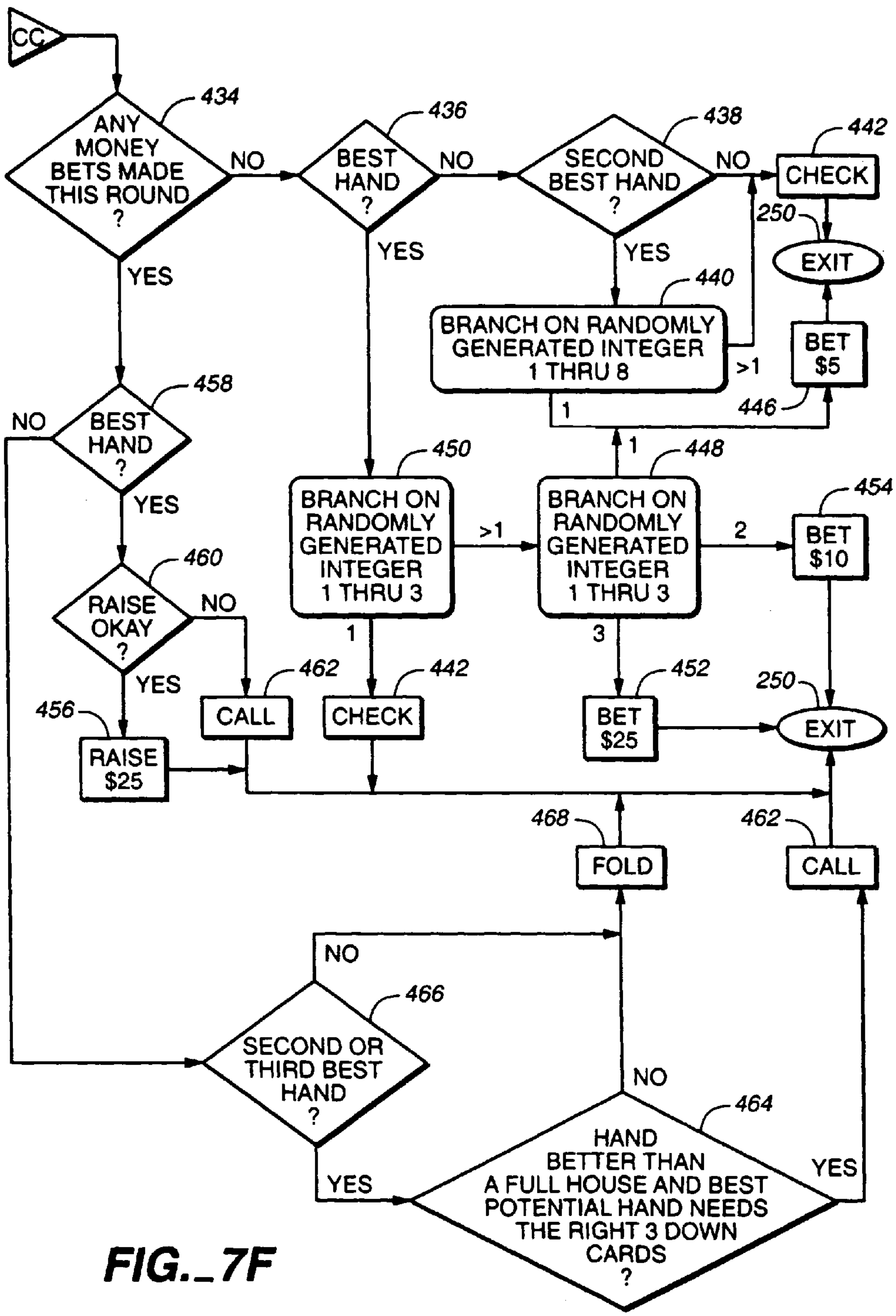
FIG. 7*f* is a flow chart showing how the server software determines a bet for a virtual player during the final betting round in accordance with the invention.

Referring to FIG. 7*d*, if the current betting round is the final betting round (step 280), the betting strategy for the virtual players changes slightly (point CC; see FIG. 7*f*).

In FIG. 7*f*, the server software first determines whether any money bets have been placed during the current round (step 434). If so, the server software then determines whether the virtual player possesses the best hand of the players (step 458). If the virtual player does possess the best hand and a raise is permitted (step 460), the virtual player raises the bet by twenty-five virtual dollars (step 456). If no raise is permitted (step 460), the virtual player calls (step 462). If the virtual player possesses either the second- or third-best hand (step 466), has a hand better than a full house, and the best potential hand needs the right three down cards to beat the virtual player's hand (step 464), the virtual player calls (step 462). If the requirements of step 464 are not satisfied, the virtual player folds (step 468).

If no money bets have been placed during the final betting round, the server software determines whether the virtual player possesses the best hand of all the players (step 436). If the virtual player does possess the best hand, the server software randomly generates an integer between 1 and 3 (step 450). If 1 is generated, the virtual player checks (step 442). If an integer greater than 1 is generated, the server software will again randomly generate an integer between 1 and 3 (step 448). If 1 is generated, the virtual player bets five virtual dollars (step 446). If 2 is generated, the virtual player bets ten virtual dollars (step 454). If 3 is generated, the virtual player bets twenty-five virtual dollars (step 452).

If the virtual player does not possess the best hand, the server software determines whether the virtual player possesses the next best hand (step 438). If not, the virtual player checks (step 442). If the virtual player does possess the second-best hand, the server software randomly generates an integer between 1 and 8 (step 440). If 1 is generated, the virtual player bets five virtual dollars (step 446). If an integer greater than 1 is generated, the virtual player checks (step 442). Once the server software has determined the virtual player's betting action, the server software exits this routine (step 250).

Figure 8A:
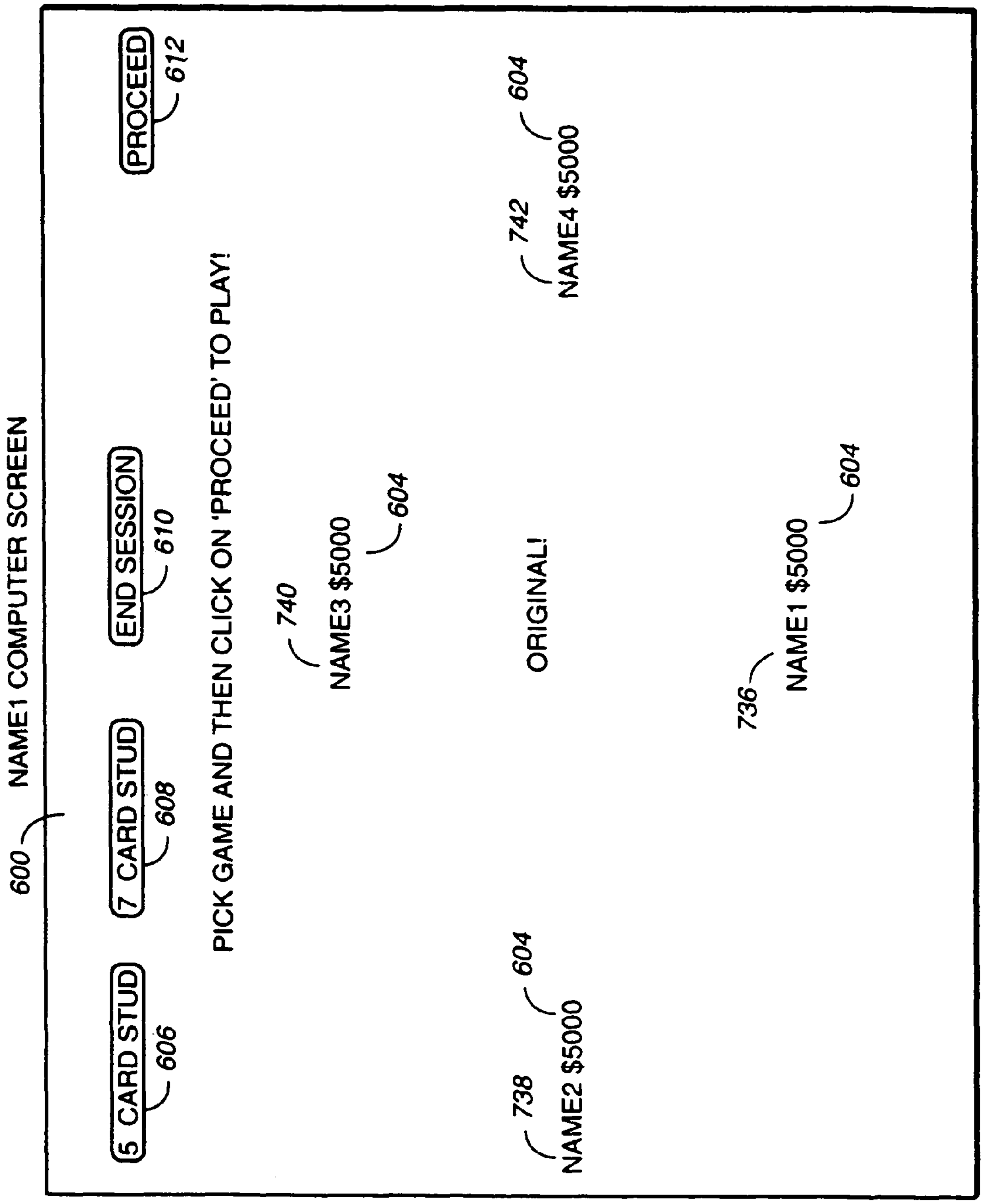
FIG. 8*a* is an example of how a player's screen may appear when he or she is the dealer for selecting the next game to be played.
Figure 8B:
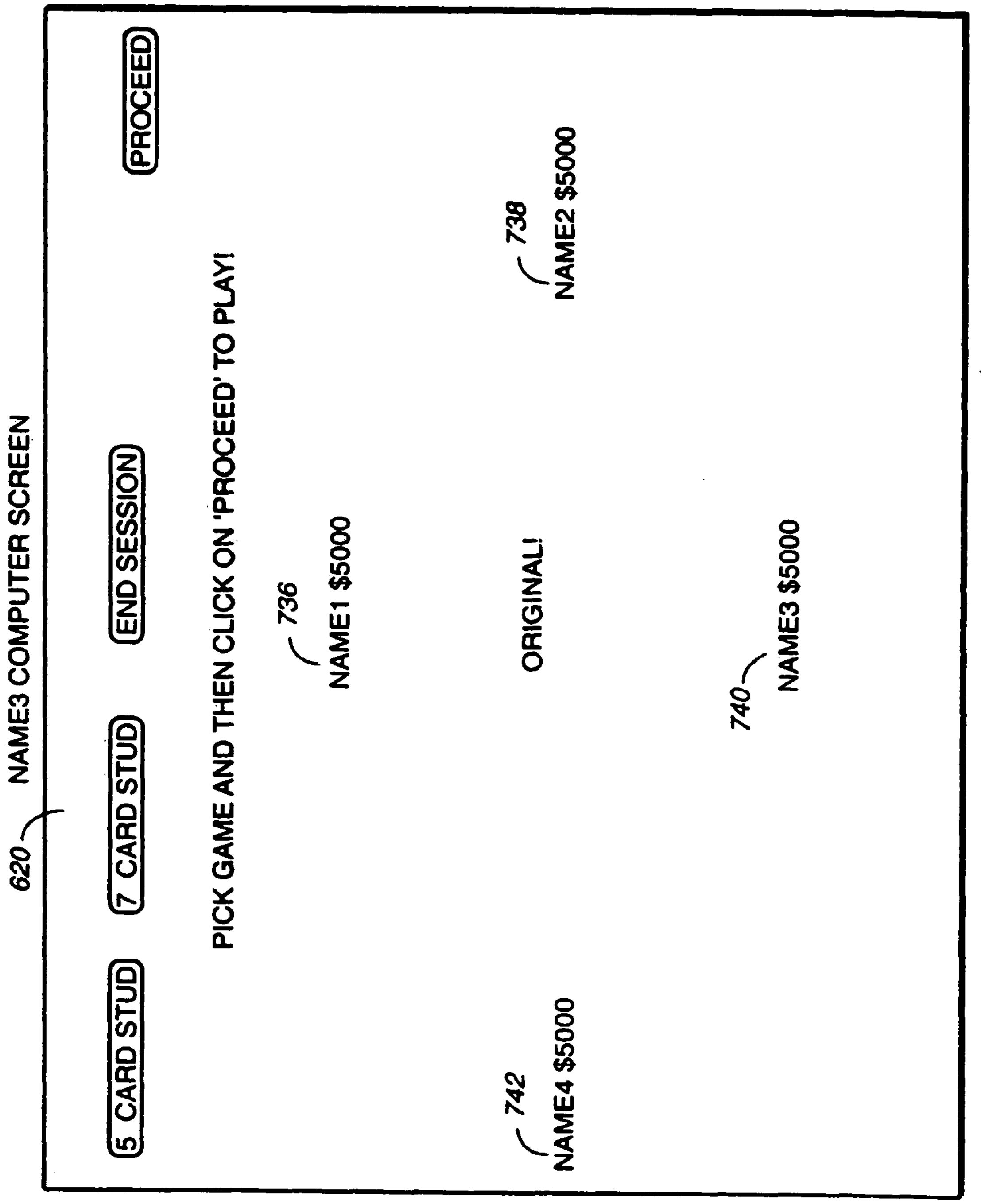
FIG. 8*b* is an example of how a player's screen may appear when he or she is the dealer for selecting the next game to be played.

When a real player is the dealer, the associated client software displays a screen for game selection. In this embodiment for a four person playing session of Original 5 card stud, FIG. 8*a* represents the game selection screen display 600 for the player associated with NAME1 736 when he or she is the dealer and FIG. 8*b* represents the game selection screen display 620 for the player associated with NAME3 740 when he or she is the dealer. Note that in FIG. 8*a* players are arranged so that NAME1 736 appears at the bottom of the screen and similarly in FIG. 8*b* NAME3 740 appears at the bottom of the screen.

Referring now to FIG. 8*a*, each player's holdings 604, which is $5,000 at the start of a playing session, is displayed next to their name. For game selection, buttons labeled "5 CARD STUD" 606, "7 CARD STUD" 608, "END SESSION" 610 and "PROCEED" 612 are used. The dealer clicks on the desired game and then presses the "PROCEED" button 612 to inform the client software to send a message to the server software identifying the current game (see FIG. 4*a* and accompanying text).

Figure 9A:
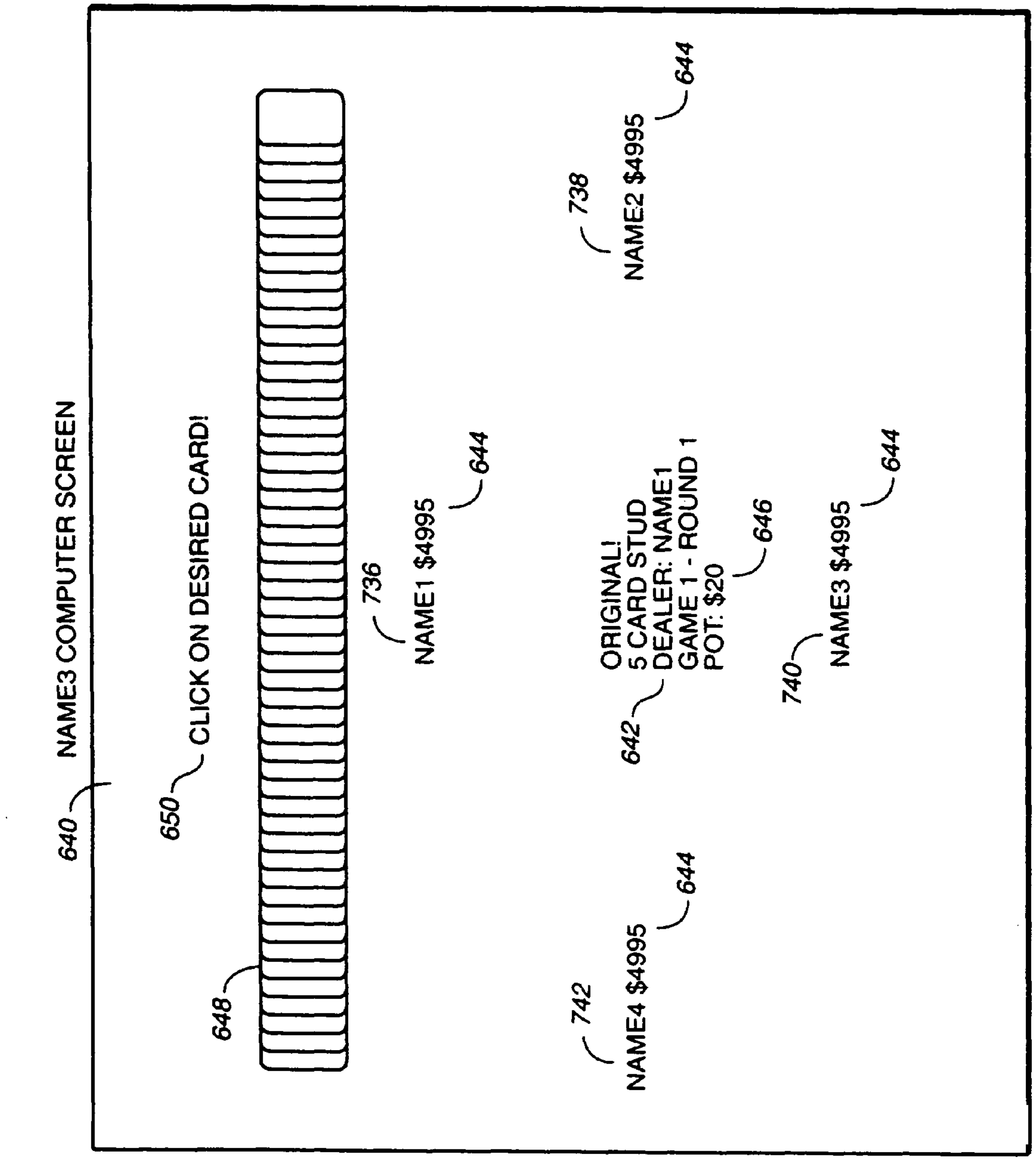
FIG. 9*a* is an example of how a player's screen may appear when he or she is selecting a card.
Figure 9B:
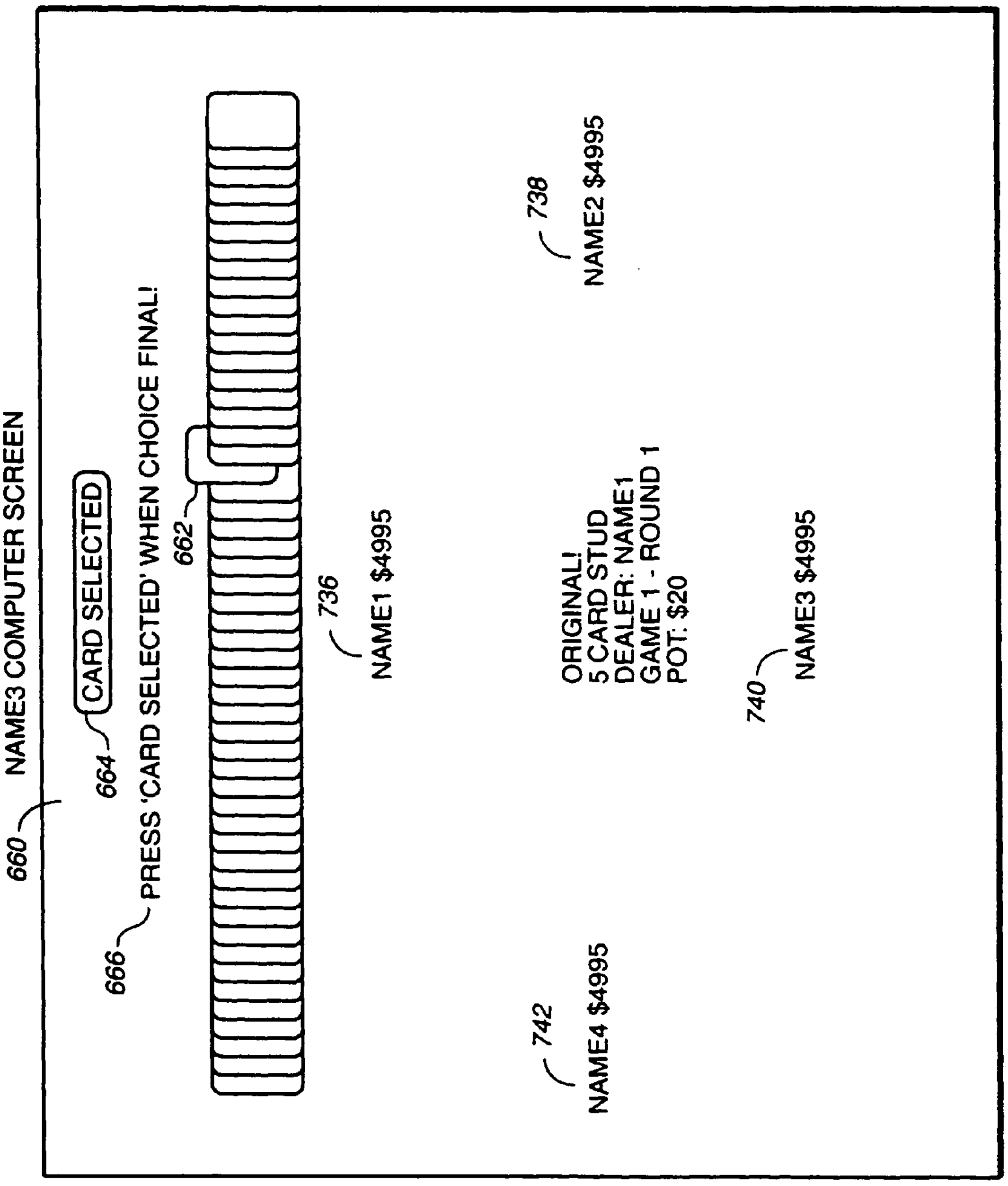
FIG. 9*b* shows what information a player's screen contains when he or she is selecting a card.

In this embodiment for a four-person playing session of Original 5 card stud, FIG. 9*a* and FIG. 9*b* represent the card selection screen display 640 and 660, respectively, for the player associated with NAME3 740 on round one of the first game when the player associated with NAME1 736 has selected the current game 642 and each player antes $5 at the beginning of each game. Referring to FIG. 9*a*, each player's holdings have now been reduced to $4995 644 because of the ante and the pot contains $20 646. For card selection, a standard deck of 52 playing cards 648 and the statement "CLICK ON DESIRED CARD!" 650 are displayed on the screen.

Referring to FIG. 9*b*, when the player associated with NAME3 740 clicks on a card, that card is offset 662 by NAME3's 740 client software and a button labeled "CARD SELECTED" 664 and a statement reading "PRESS CARD SELECTED WHEN CHOICE IS FINAL!" 666 are displayed by NAME3's 740 client software. The player associated with NAME3 clicks on "CARD SELECTED" 666 to inform the client software to send a message to the server software identifying the selected card for NAME3 740.

Figure 10:
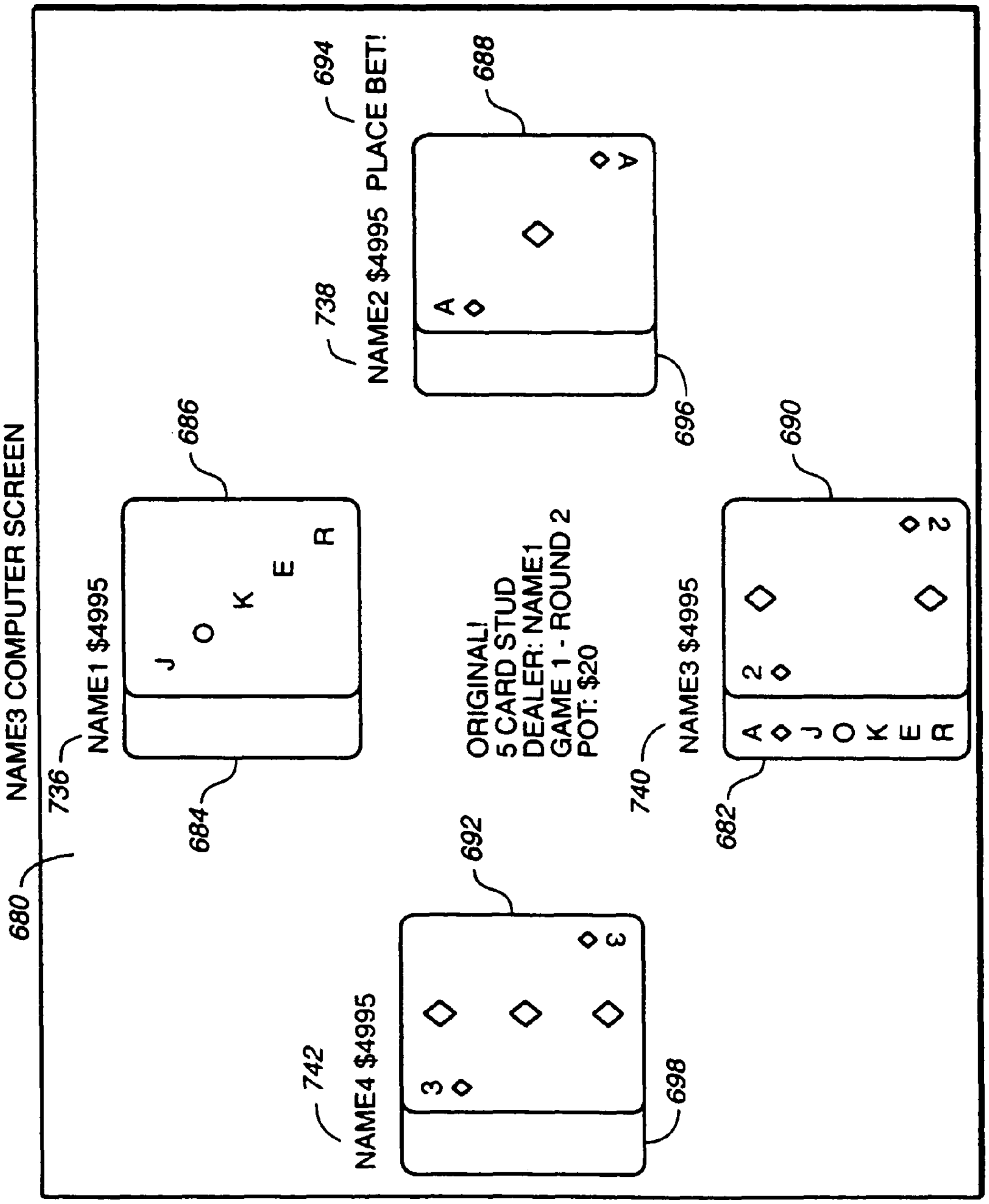
FIG. 10 is an example of how various dealt cards are displayed on a player's screen.

In an embodiment for a four-person session of Original 5 card stud, FIG. 10 represents the screen display for NAME3 740 after all cards are dealt in round two but before any betting 680. FIG. 10 is based on the following cards being selected and dealt to each of the players in the first two rounds. In round one, the player associated with NAME1 736 selected the ace of diamonds and was dealt a joker 684 because the player associated with NAME3 740 also selected the ace of diamonds 682, the player associated with NAME2 738 selected and was dealt the four of diamonds 696, the player associated with NAME3 740 selected the ace of diamonds and was dealt a joker 682 because NAME1 736 also selected the ace of diamonds and the player associated with NAME4 742 selected and was dealt the three of clubs 698. In the first round of 5 card stud cards are dealt face-down 684, 696, 698; therefore, on NAME3's screen 680 the only round one dealt card displayed face-up by his or her client software is NAME3's 682. Both the selected card and the dealt card are represented by a single card 682. In round two, NAME1 736 selected the four of diamonds and was dealt a joker 686 because the four of diamonds was dealt face-down 696 to NAME2 738 in round one; NAME2 738 selected and was dealt the ace of diamonds 688 because though the ace of diamonds was selected in round one by NAME1 684 and NAME3 682 it was never dealt and therefore was still free at the start of round two; NAME3 740 selected and was dealt the two of diamonds 690; and NAME4 742 selected and was dealt the three of diamonds 692. Note that the player associated with NAME2 738 is the first bettor in round two 694 because he or she has the best hand based on face-up cards only.

Figure 11A:
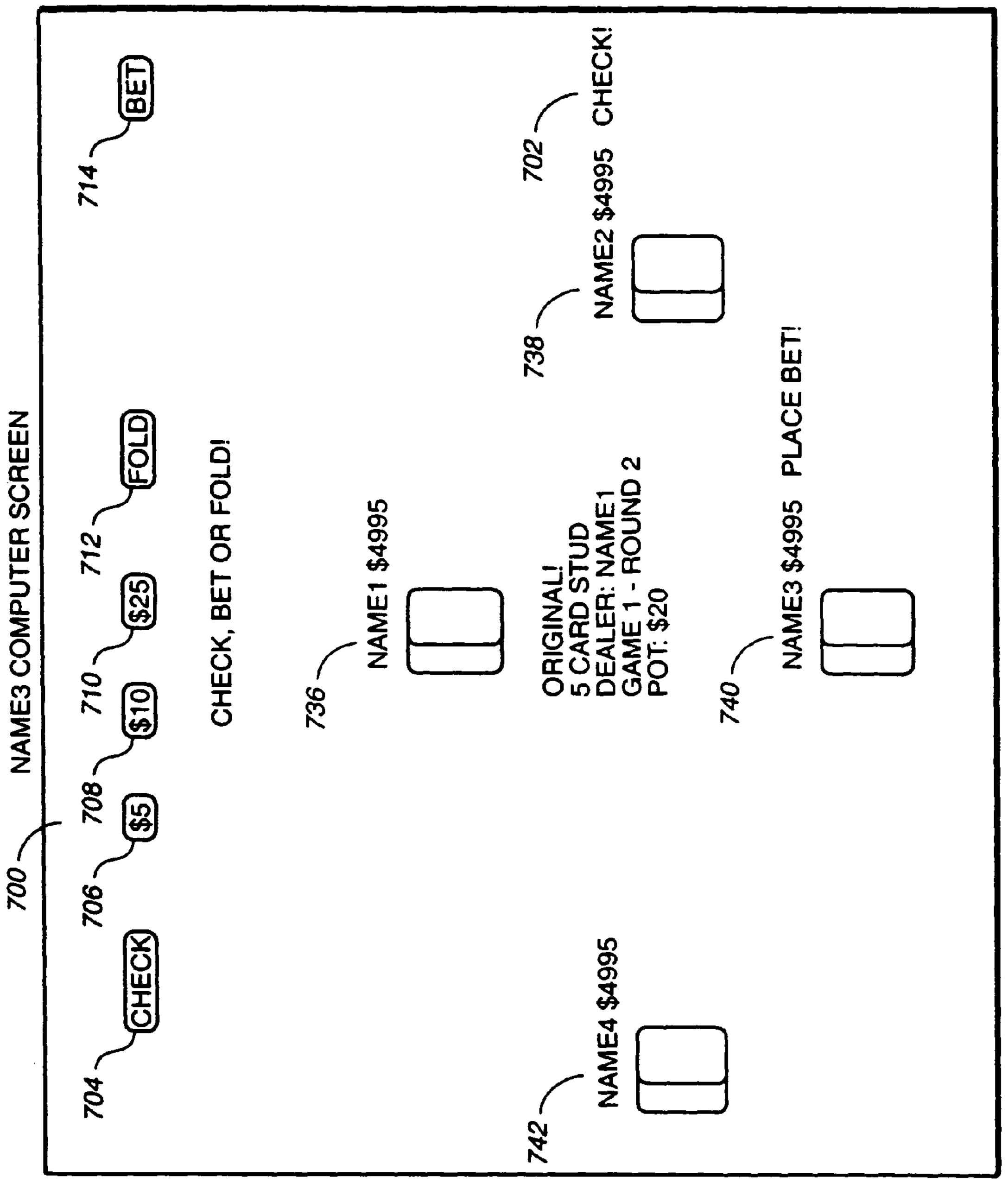
FIG. 11*a* is an example of how a player's screen may appear during betting.
Figure 11B:
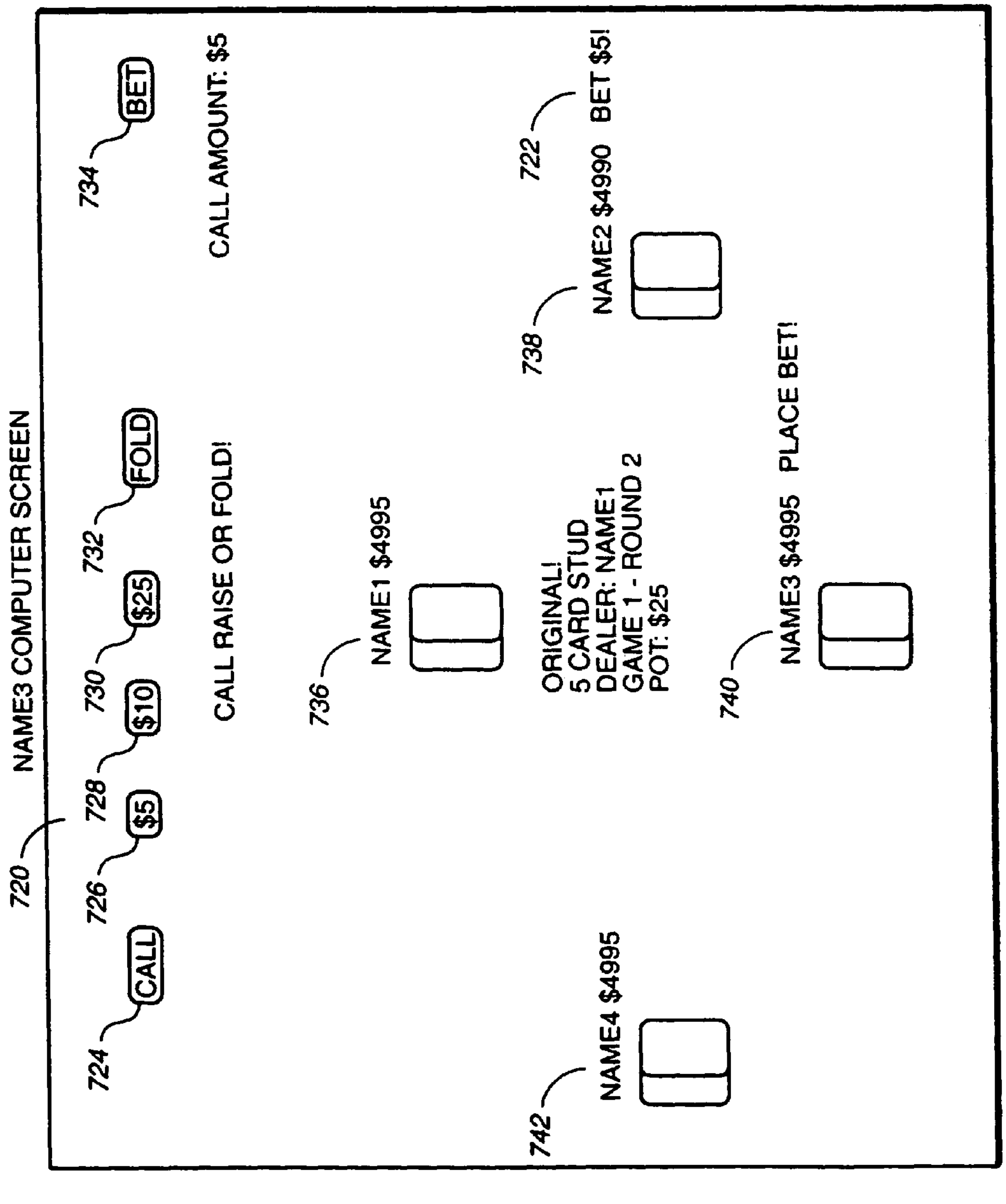
FIG. 11*b* is an example of how a player's screen may appear during betting.

FIG. 11*a* represents the bet selection screen display 700 for the player associated with NAME3 740 when NAME2 738 was the first bettor and checked 702 and FIG. 11*b* represents the bet selection screen display 720 for the player associated with NAME3 740 when the player associated with NAME2 738 was the first bettor and bet $5 722. Referring to FIG. 11*a* buttons labeled "CHECK" 704, "$5" 706, "$10" 708, "$25" 710, "FOLD" 712, and "BET" 714 are displayed. NAME3 740 clicks on the desired bet button (704, 706, 708, 710, and 712) and then clicks on "BET" 714 to inform the client software to send a message to the server software identifying the bet for NAME3 740.

Referring to FIG. 11*b* buttons labeled "CALL" 724, "$5" 726, "$10" 728, "$25" 730, "FOLD" 732, and "BET" 734 are displayed, NAME3 740 clicks on the desired bet button (724, 726, 728, 730, and 732) and then clicks on "BET" 734 to inform the client software to send a message to the server software identifying the bet for NAME3 740.

In an additional embodiment of the invention, on at least one round, though not every round, every player, real or virtual, receives a card randomly dealt from the cards remaining in the deck. The determination of which round or rounds will feature randomly-dealt cards can be programmed in default settings for the game, set by a player before the game starts, or may be randomly set by the software before the game starts.

In yet another embodiment of the invention, cards in any round may be dealt face-up to every player. The determination of which round or rounds will feature cards that are dealt face-up and which round or rounds will feature cards that are dealt face-down can be programmed in default settings for the game, set by a player before the game starts, or may be randomly set by the software before the game starts.

In one embodiment of the invention, on at least one round, though not every round, a single randomly-dealt community card is dealt face-up from the cards remaining in the deck and may be used by any number of players as a card dealt to them. As with the other embodiments listed above, the determination of whether this embodiment will be employed and in which round or rounds it may be employed can be programmed in default settings for the game, set by a player before the game starts, or may be randomly set by the software before the game starts. If a real player wishes to use a community card for his or her best hand, the player will indicate his or her preference by highlighting the card. In other embodiments, the software can automatically determine the player's best hand.

Players may select more than one card per round in another embodiment. Each player selects the same number of cards and specifies the order of selection. Game software will determine which cards to deal and in what order. For instance, if two cards are selected per round, the players choose the cards and the order of selection, the game software then analyzes the players' first card choices and distributes the cards accordingly, and then the game software analyzes the players' choice for a second card and distributes the cards. The determination of which round or rounds will feature multiple card selection by each player can be programmed in default settings for the game, set by a player before the game starts, or may be randomly set by the software before the game starts.

In other embodiments any round may be a betting round. The determination of which round or rounds will feature betting may be programmed in default settings for the game, set by a player before the game starts, or randomly set by the software before the game starts.

In other embodiments the number of rounds may be one or more. The determination of the number of rounds may be programmed in default settings for the game, set by a player before the game starts, or randomly set by the software before the game starts.

The game may also function in a standalone system where no connection to a network is necessary to play the game. In this embodiment, there is one real player and the other players are virtual. The game software combines the processing capabilities of client and server game software. The game software may be downloaded to the player's computer from a network or may be contained on some computer-readable media such as a floppy or compact disk.

Tournaments, in which each real player plays against virtual players, may be conducted. In this embodiment, the computers used by the real players are connected to a network and server software controls the games. Each player will indicate to the server software if he or she wishes to take part in the tournament. The server software ensures that the virtual players make the same selections when two or more real players find themselves in identical playing situations, i.e., where game conditions are the same. This embodiment provides a "level playing field" for tournament participants. The control exercised by the server software allows it to determine which real player (or players) has the highest score at the end of the tournament.

These embodiments may be combined within one game. For instance, in addition to at least one round in which the dealt cards are based on player card selection, a game may feature some rounds where each player receives a randomly-dealt card chosen by the game software as well as some rounds where a single randomly-dealt community card is dealt face-up and may be used by any number of players.

As seen, certain embodiments of the invention include: A method for playing a computer-based card game comprising:

a) receiving at least one card from a deck of playing cards, said deck of cards the same for all players in the playing session, where the received card is:

i) based on the card selected by the player; or ii) randomly chosen by game software;

b) displaying the received card to the player;

c) displaying any face-up cards distributed to other players;

d) placing a bet during betting rounds;

e) receiving notification of bets placed by other players;

f) repeating steps a)-e) until a predetermined number of cards are delivered to each player and betting is concluded;

g) identifying the player with the best hand of cards according to predetermined rules of play; and h) repeating steps a)-g) until the playing sessions ends.

In some embodiments, the received card is dealt face-up during at least one round of play. In some embodiments, the received card is common to all players. In some embodiments, the game is played on a standalone computer system. In some embodiments, the game is played on a computer system attached to a network. In some embodiments, at least one of the other players is virtual. In some embodiments, at least one of the other players is real.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A method for playing a card game on a computing device having a display screen (640), the computing device being programmed to carry out the card game using card representations stored in a memory, the program enabling an actual player to play the card game against at least one virtual player controlled by the computing device, a player remaining in the game being defined as an active player, the method comprising:

a) displaying to the actual player on the display screen (640) one or more randomly dealt community cards from a deck of playing cards, the one or more community cards being usable by all players in forming a card hand, all community cards in the card game being randomly dealt before any cards are dealt to individual players, the deck of playing cards being a representation of a physical deck of cards, the display screen (640) displaying the deck of playing cards (648) face up;

b) if the actual player is active, selecting by the actual player using a computer interface a desired card of a particular rank and suit from the deck of playing cards excluding the randomly dealt cards in step (a);

c) selecting by each active, virtual player a card of a particular rank and suit from the deck of playing cards excluding the randomly dealt cards in step (a);

d) for each active player, determining if the card selected by that player is the same as a card selected by another player in a current round or the same as a card dealt to another player in a previous round;

e) if a first player chose the same card as another player, as determined in step (d), dealing the first player a null card that has no value in forming a card hand, wherein, if the first player is an actual player, the null card (682) is displayed on the display screen (640) along with the rank and suit of the corresponding card the first player selected, wherein, if the first player is a virtual player and the null card is dealt face up, the null card (686) is displayed on the display screen (640) with no display of the rank and suit of the corresponding card selected by the virtual player, so that the actual player does not see the identity of the corresponding card selected by the virtual player;

f) if the first player did not choose the same card as another player, as determined in step (d), dealing the first player the card that the first player selected, wherein, the display screen (640) displays the order and identity of every card selected by the actual player and the order of every card dealt to every virtual player along with the identity of every card dealt face up;

g) repeating steps b-f if there is more than one active player after a round of play, until the same predetermined number of cards have been dealt to each active player, with the cards being dealt face up on at least one round; and h) controlling the display screen (640) to identify the active player with the best hand of cards, according to predetermined rules of play.

2. The method of claim 1 wherein step (g) comprises:

g) repeating steps b-f if there is more than one active player after a round of play, until the same predetermined number of cards have been dealt to each active player.

3. The method of claim 2 wherein step (h) comprises:

h) controlling the display screen (640) to identify the active player with the best hand of cards, made from at least one randomly dealt card in step (a) and at least one card dealt to that player, according to predetermined rules of play.

4. The method of claim 1 wherein step (d) comprises:

d) for each active player, determining if the card selected by that player is the same as a card selected by another player in a current round or a previous round.

5. The method of claim 4 wherein step (g) comprises:

g) repeating steps b-f if there is more than one active player after a round of play, until the same predetermined number of cards have been dealt to each active player.

6. The method of claim 5 wherein step (h) comprises:

h) controlling the display screen (640) to identify the active player with the best hand of cards, made from at least one randomly dealt card in step (a) and at least one card dealt to that player, according to predetermined rules of play.

7. The method of claim 4 wherein step (h) comprises:

h) controlling the display screen (640) to identify the active player with the best hand of cards, made from at least one randomly dealt card in step (a) and at least one card dealt to that player, according to predetermined rules of play.

8. The method of claim 1 wherein step (h) comprises:

h) controlling the display screen (640) to identify the active player with the best hand of cards, made from at least one randomly dealt card in step (a) and at least one card dealt to that player, according to predetermined rules of play.

9. A method for playing the same card game on multiple computing devices each having a display screen (640), each computing device being programmed for a single actual player to carry out the card game using card representations stored in a memory, the program enabling each actual player to play the card game against at least one virtual player controlled by the same computing device, where the number of virtual players is the same for each of the multiple computing devices, a player remaining in the game being defined as an active player, the method comprising:

a) displaying to each actual player on that player's display screen (640) the same one or more randomly dealt community cards from the same deck of playing cards, the one or more community cards being usable by all players in forming a card hand, all community cards in the card game being randomly dealt before any cards are dealt to individual players, the deck of playing cards being a representation of a physical deck of cards, each actual player's display screen (640) displaying the same deck of playing cards (648) face up;

b) selecting by each active, actual player using a computer interface a desired card of a particular rank and suit from the deck of playing cards excluding the randomly dealt cards in step (a);

c) selecting by each active, virtual player a card of a particular rank and suit from the deck of playing cards excluding the randomly dealt cards in step (a);

d) for a round where each active player selects a card, if two or more active, actual players either have selected the same sequence of cards for all previous rounds of card selection, or have selected no cards previously, then their respective computing devices insure that for each set of their corresponding active, virtual players, the players for that set select the same card in rank and suit for the round, to maintain a level playing field;

e) for each active player, determining if the card selected by that player is the same as a card selected by another player in a current round or the same as a card dealt to another player in a previous round, playing on the same computing device;

f) if a first player chose the same card as another player, as determined in step (e), dealing the first player a null card that has no value in forming a card hand, wherein, if the first player is an actual player, the null card (682) is displayed on the first player's display screen (640) along with the rank and suit of the corresponding card the first player selected, wherein, if the first player is a virtual player and the null card is dealt face up, the null card (686) is displayed on the display screen (640) of the actual player playing on the same computing device as the first player, with no display of the rank and suit of the corresponding card selected by the virtual player, so that the actual player does not see the identity of the corresponding card selected by the virtual player;

g) if the first player did not choose the same card as another player, as determined in step (e), dealing the first player the card that the first player selected, wherein, each actual player's display screen (640) displays the order and identity of every card selected by that player and the order of every card dealt along with the identity of every card dealt face up to each virtual player controlled by the same computing device;

h) repeating steps b-g on a computing device having more than one active player playing after a round of play, until the same predetermined number of cards have been dealt to each active player, playing on the computing device, with the cards being dealt face up on at least one round on the computing device; and i) controlling the display screen (640) to identify the player with the best hand of cards of all the active, actual players, according to predetermined rules of play.

10. The method of claim 9 wherein step (h) comprises:

h) repeating steps b-g on a computing device having more than one active player playing after a round of play, until the same predetermined number of cards have been dealt to each active player, playing on the computing device.

11. The method of claim 10 wherein step (i) comprises:

i) controlling the display screen (640) to identify the player with the best hand of cards of all the active, actual players, made from at least one randomly dealt card in step (a) and at least one card dealt to that player, according to predetermined rules of play.

12. The method of claim 9 wherein step (e) comprises:

e) for each active player, determining if the card selected by that player is the same as a card selected by another player in a current round or a previous round, playing on the same computing device.

13. The method of claim 12 wherein step (h) comprises:

h) repeating steps b-g on a computing device having more than one active player after a round of play, until the same predetermined number of cards have been dealt to each active player, playing on the computing device.

14. The method of claim 13 wherein step (i) comprises:

i) controlling the display screen (640) to identify the player with the best hand of cards of all the active, actual players, made from at least one randomly dealt card in step (a) and at least one card dealt to that player, according to predetermined rules of play.

15. The method of claim 12 wherein step (i) comprises:

i) controlling the display screen (640) to identify the player with the best hand of cards of all the active, actual players, made from at least one randomly dealt card in step (a) and at least one card dealt to that player, according to predetermined rules of play.

16. The method of claim 9 wherein step (i) comprises:

i) controlling the display screen (640) to identify the player with the best hand of cards of all the active, actual players, made from at least one randomly dealt card in step (a) and at least one card dealt to that player, according to predetermined rules of play.

17. A method for playing the same card game on multiple computing devices each having a display screen (640), the computing devices being programmed to carry out the card game using card representations stored in a memory, the program enabling an actual player using one of the computing devices to play the card game against at least one other actual player using another one of the computing devices, a player remaining in the game being defined as an active player, the method comprising:

a) displaying to each actual player on that player's display screen (640) the same one or more randomly dealt community cards from the same deck of playing cards, the one or more community cards being usable by all players in forming a card hand, all community cards in the card game being randomly dealt before any cards are dealt to individual players, the deck of playing cards being a representation of a physical deck of cards, each actual player's display screen (640) displaying the same deck of playing cards (648) face up;

b) selecting by each active player a desired card of a particular rank and suit from the deck of playing cards excluding the randomly dealt cards in step (a);

c) for each active player, determining if the card selected by that player is the same as a card selected by another player in a current round or the same as a card dealt to another player in a previous round;

d) if a first player chose the same card as another player, as determined in step (c), dealing the first player a null card that has no value in forming a card hand, wherein, if the first player is an actual player, the null card (682) is displayed on the first player's display screen (640) along with the rank and suit of the corresponding card the first player selected, wherein, if the first player is an actual player and a null card is dealt face up to another player, that null card (686) is displayed on the first player's display screen (640) with no display of the rank and suit of the corresponding card selected by another player, so that the first player does not see the identity of the corresponding card selected by another player;

e) if the first player did not choose the same card as another player, as determined in step (c), dealing the first player the card that the first player selected, wherein, each actual player's display screen (640) displays the order and identity of every card selected by that player and the order of every card dealt to every other player along with the identity of every card dealt face up;

f) repeating steps b-e if there is more than one active player after a round of play, until the same predetermined number of cards have been dealt to each active player; and g) controlling the display screen (640) to identify the active player with the best hand of cards, according to predetermined rules of play.

18. The method of claim 17 wherein step (g) comprises:

g) controlling the display screen (640) to identify the active player with the best hand of cards, made from at least one randomly dealt card in step (a) and at least one card dealt to that player, according to predetermined rules of play.

19. The method of claim 17 wherein step (c) comprises:

c) for each active player, determining if the card selected by that player is the same as a card selected by another player in a current round or a previous round.

20. The method of claim 19 wherein step (g) comprises:

g) controlling the display screen (640) to identify the active player with the best hand of cards made from at least one randomly dealt card in step (a) and at least one card dealt to that player, according to predetermined rules of play.

21. The method of claim 17 wherein step (f) comprises:

f) repeating steps b-e if there is more than one active player after a round of play, until the same predetermined number of cards have been dealt to each active player, with the cards being dealt face up on at least one round.

22. The method of claim 21 wherein step (g) comprises:

g) controlling the display screen (640) to identify the active player with the best hand of cards, made from at least one randomly dealt card in step (a) and at least one card dealt to that player, according to predetermined rules of play.

23. The method of claim 21 wherein step (c) comprises:

c) for each active player, determining if the card selected by that player is the same as a card selected by another player in a current round or a previous round.

24. The method of claim 23 wherein step (g) comprises:

g) controlling the display screen (640) to identify the active player with the best hand of cards made from at least one randomly dealt card in step (a) and at least one card dealt to that player, according to predetermined rules of play.

* * * * *